(12) United States Patent
Hoshino et al.

(10) Patent No.: US 11,836,961 B2
(45) Date of Patent: Dec. 5, 2023

(54) INFORMATION PROCESSING APPARATUS, INFORMATION PROCESSING METHOD, AND STORAGE MEDIUM FOR DETERMINING WHETHER A CAPTURED IMAGE OF A SUBJECT IS SUITABLE FOR RECOGNITION PROCESSING

(71) Applicant: CANON KABUSHIKI KAISHA, Tokyo (JP)

(72) Inventors: Shoichi Hoshino, Tokyo (JP); Atsushi Nogami, Kanagawa (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 17/200,573

(22) Filed: Mar. 12, 2021

(65) Prior Publication Data
US 2021/0303896 A1 Sep. 30, 2021

(30) Foreign Application Priority Data
Mar. 31, 2020 (JP) .................................. 2020-063890

(51) Int. Cl.
*G06V 10/30* (2022.01)
*G06V 10/42* (2022.01)
*G06V 10/764* (2022.01)
*G06F 18/21* (2023.01)
*G06V 10/82* (2022.01)

(52) U.S. Cl.
CPC .......... *G06V 10/30* (2022.01); *G06F 18/2163* (2023.01); *G06V 10/431* (2022.01); *G06V 10/764* (2022.01); *G06V 10/82* (2022.01)

(58) Field of Classification Search
CPC ...... G06V 10/993; G06V 10/22; G06V 10/44; G06V 10/56; G06V 10/431; G06V 10/764; G06V 10/82; G06V 10/30; G06K 9/6261
See application file for complete search history.

(56) References Cited

U.S. PATENT DOCUMENTS

| | | | | |
|---|---|---|---|---|
| 10,628,924 | B2 * | 4/2020 | Wang | H04N 1/4092 |
| 11,120,293 | B1 * | 9/2021 | Rosenzweig | G06F 16/7837 |
| 11,404,243 | B1 * | 8/2022 | Own | H01J 37/228 |
| 2019/0079719 | A1 * | 3/2019 | Hobbs | G06V 40/16 |
| 2019/0185186 | A1 * | 6/2019 | Li | G07C 5/0808 |
| 2020/0118154 | A1 * | 4/2020 | Schumacher | G06K 9/6274 |
| 2020/0250806 | A1 * | 8/2020 | Kuwabara | G06T 7/70 |
| 2020/0322546 | A1 * | 10/2020 | Carolus | H04N 5/2254 |
| 2020/0349379 | A1 * | 11/2020 | Ross | G06V 20/63 |
| 2021/0037700 | A1 * | 2/2021 | Day | A01M 7/0003 |
| 2021/0233303 | A1 * | 7/2021 | Takahashi | G06T 9/00 |
| 2021/0235067 | A1 * | 7/2021 | Valli | H04N 13/366 |
| 2022/0191401 | A1 * | 6/2022 | Asukabe | G06V 40/16 |

FOREIGN PATENT DOCUMENTS

| | | |
|---|---|---|
| JP | 2011242365 A | 12/2011 |
| JP | 2015153040 A | 8/2015 |
| JP | 2019134431 A | 8/2019 |

* cited by examiner

*Primary Examiner* — Ming Y Hon
(74) *Attorney, Agent, or Firm* — Canon U.S.A., Inc. IP Division

(57) ABSTRACT

An information processing apparatus includes a map creation unit configured to create a defocus map corresponding to a captured image of a subject, an object setting unit configured to set a recognition target, and a determination unit configured to determine, based on the defocus map, whether the recognition target is recognizable in the image.

25 Claims, 18 Drawing Sheets

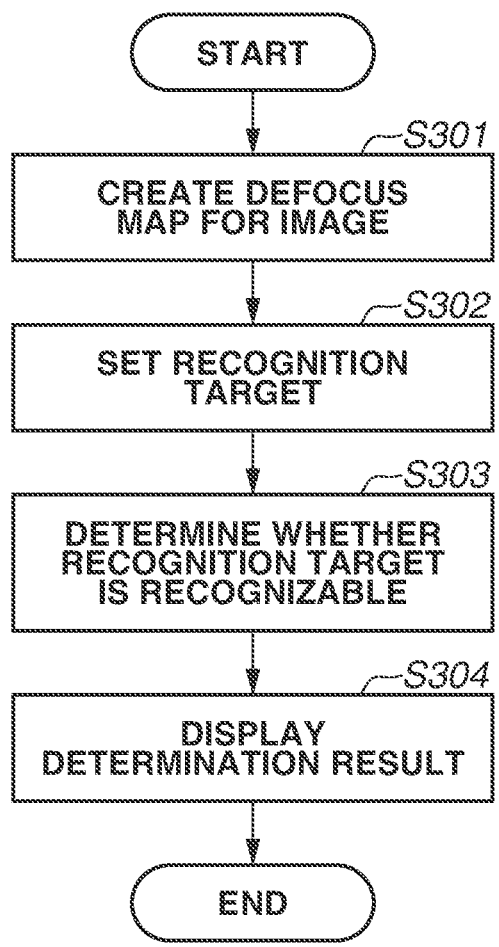

FIG.6A

| RECOGNITION TARGET | DEFOCUS REFERENCE VALUE | |
|---|---|---|
| | LOWER LIMIT | UPPER LIMIT |
| CRACK (EXTREMELY WIDE) | -4 | +4 |
| CRACK (WIDE) | -3 | +3 |
| CRACK (MODERATE) | -2 | +2 |
| CRACK (NARROW) | -1 | +1 |
| CRACK (EXTREMELY NARROW) | 0 | 0 |

| MODEL NAME | RECOGNITION TARGET |
|---|---|
| MODEL M1 | CRACK (EXTREMELY WIDE) |
| MODEL M2 | CRACK (WIDE) |
| MODEL M3 | CRACK (MODERATE) |
| MODEL M4 | CRACK (NARROW) |
| MODEL M5 | CRACK (EXTREMELY NARROW) |

FIG.6C

| MODEL NAME | RECOGNITION TARGET |
|---|---|
| MODEL M11 | CRACK |
| MODEL M12 | EFFLORESCENCE |
| MODEL M13 | REINFORCING STEEL EXPOSURE |
| MODEL M14 | WATER LEAKAGE |
| MODEL M15 | DELAMINATION |

FIG.6D

| RECOGNITION TARGET | DEFOCUS REFERENCE VALUE | |
|---|---|---|
| | LOWER LIMIT | UPPER LIMIT |
| CRACK | -2 | +2 |
| EFFLORESCENCE | -4 | +4 |
| REINFORCING STEEL EXPOSURE | -2 | +2 |
| WATER LEAKAGE | -2 | +2 |
| DELAMINATION | -1 | +1 |

FIG.6E

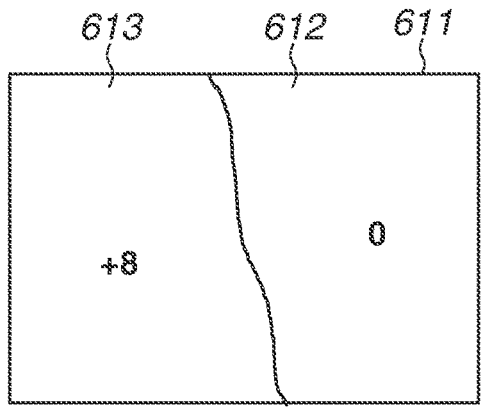

| MODEL NAME | DEFOCUS VALUE RANGE |
|---|---|
| MODEL M21 | -2 ~ +5 |
| MODEL M22 | +6 ~ +10 |
| MODEL M23 | +11 ~ +15 |

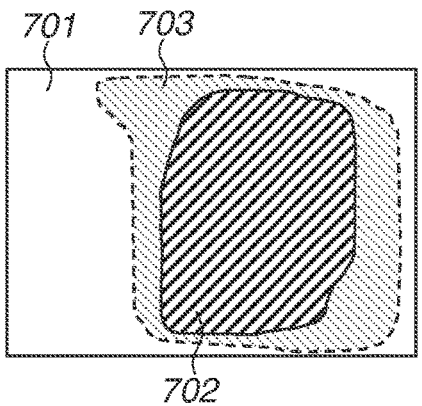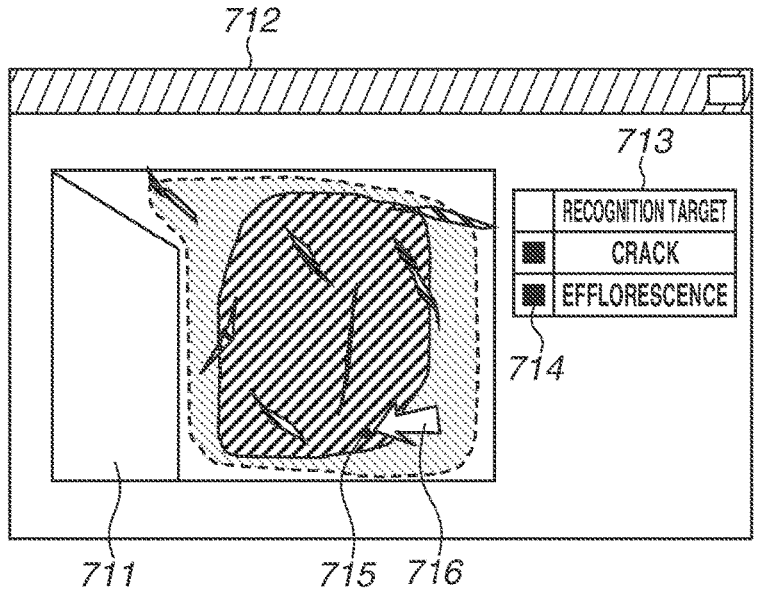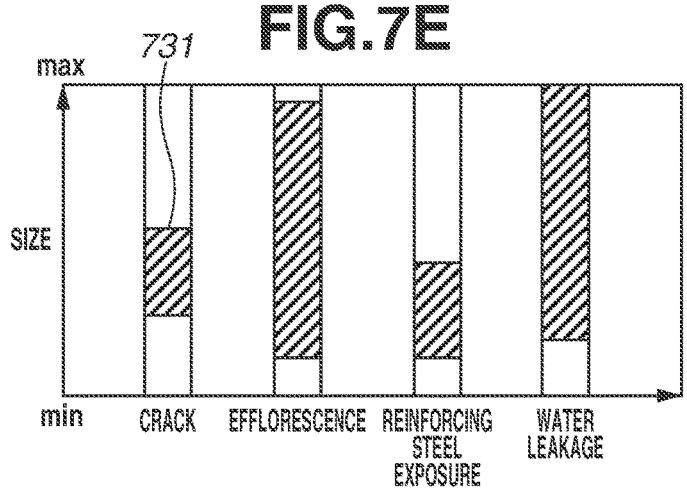

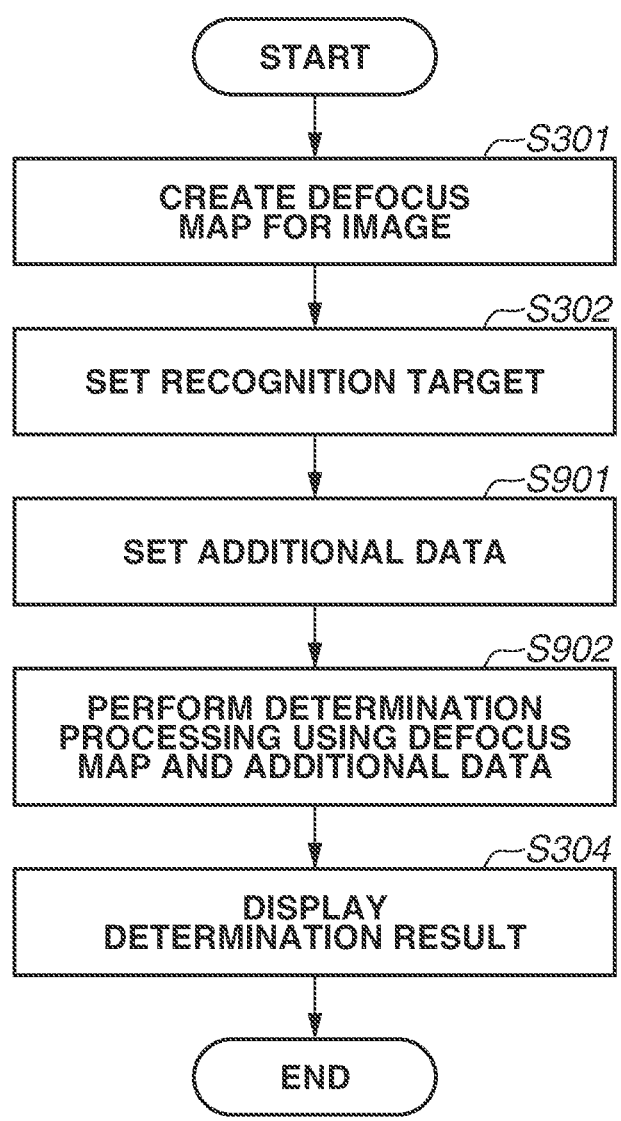

FIG.17A
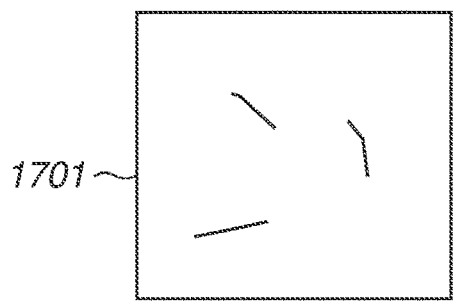
FIG.17B
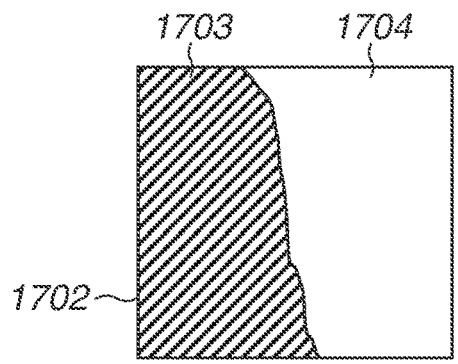
FIG.17C
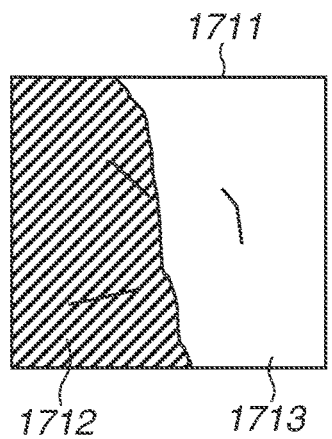
FIG.17D
| | CALCULATED VALUE | REFERENCE VALUE |
|---|---|---|
| BRIGHTNESS OF IMAGE | AVERAGE LUMINANCE VALUE | 50 |
| TEXTURE | LUMINANCE VALUE DISPERSION | 10 |
| COLOR (RED) | AVERAGE R-VALUE | 60 |
| COLOR (GREEN) | AVERAGE G-VALUE | 70 |
| COLOR (BLUE) | AVERAGE B-VALUE | 80 |
| ... | ... | ... |

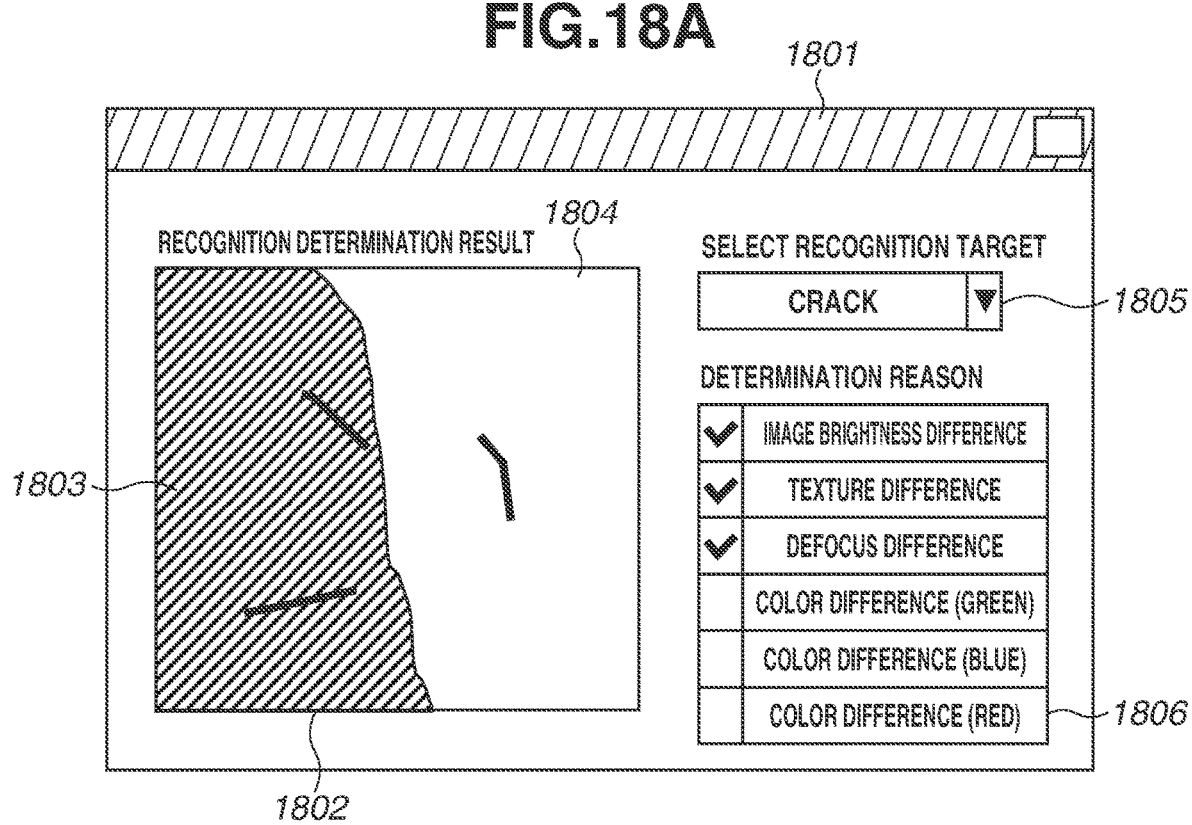

INFORMATION PROCESSING APPARATUS, INFORMATION PROCESSING METHOD, AND STORAGE MEDIUM FOR DETERMINING WHETHER A CAPTURED IMAGE OF A SUBJECT IS SUITABLE FOR RECOGNITION PROCESSING

BACKGROUND

Field of the Disclosure

The present disclosure relates to an information processing technique for image recognition.

Description of the Related Art

In inspecting a wall surface of a structure, such as a bridge, or inspecting an external appearance of a part or a product, for example, an image inspection using a captured image of an inspection target is carried out. In this image inspection, an inspection method for automatically recognizing a crack, a flaw, or the like by a pattern recognition technique has recently been proposed (see Japanese Patent Application Laid-Open No. 2011-242365). In the pattern recognition technique discussed in Japanese Patent Application Laid-Open No. 2011-242365, in a case of recognizing a fine crack, the recognition accuracy may deteriorate due to the effect of a blur of an image (blur due to defocusing). In general, an image with a large degree of blur is not suitable for recognition processing, and thus it may be desirable to use an in-focus image. On the other hand, in a case of recognizing a wide crack, the crack can be visually recognized even in a slightly blurred image, and thus the blurred image has a less effect on the recognition accuracy. Accordingly, depending on the type of a recognition target object, a blurred image can also be used as an image suitable for recognition processing.

In a case of determining whether an image to be used is suitable for recognition processing, a user needs to check a degree of focus at each position in the image while visually observing the image. However, if the image is large, it may be necessary to repeatedly perform the operation of visually observing a part of the image while enlarging and displaying the image and then visually observing another part of the image while enlarging and displaying the image, which takes a lot of time and labor. As a technique for saving the time and labor for performing such an operation, Japanese Patent Application Laid-Open No. 2015-153040 discusses a technique for calculating a single focus degree based on an image captured by fixing image capturing conditions, such as an angle of view and a focal length, and determining whether the captured image is suitable for recognition processing based on the calculated focus degree.

SUMMARY

According to an aspect of some embodiments, an information processing apparatus includes a map creation unit configured to create a defocus map corresponding to a captured image of a subject, an object setting unit configured to set a recognition target, and a determination unit configured to determine, based on the defocus map, whether the recognition target is recognizable in the image.

BRIEF DESCRIPTION OF THE DRAWINGS

FIG. 3 is a flowchart illustrating information processing according to the first exemplary embodiment.

FIGS. 6A to 6F are diagrams used to describe determination processing.

FIGS. 7A to 7E are diagrams used to describe determination result display processing.

FIG. 9 is a flowchart illustrating information processing according to the second exemplary embodiment.

FIGS. 17A to 17D are diagrams used to describe processing for determining a determination reason.

FIGS. 18A and 18B are diagrams each illustrating a display example of a determination reason.

DESCRIPTION OF THE EMBODIMENTS

In capturing an image of a wall surface of a structure, it may be necessary to capture an image for each subject (for each structure, or for each wall surface) while adjusting an angle of view, a focal length, and the like depending on the structure of the subject, and the position or range of the subject in the image varies. Therefore, it may be necessary for a user to perform an operation to determine whether the image is suitable for recognition processing while checking a degree of focus of the entire image. However, such an operation puts a heavy load on the user.

Accordingly, exemplary embodiments for enhancing the operating efficiency by reducing the work load on the user in a case of determining whether a captured image of a subject is suitable for recognition processing on a recognition target will be described.

Exemplary embodiments will be described in detail below with reference to the drawings. Configurations described in the following exemplary embodiments are representative examples, and the scopes of some embodiments are not limited to the specific configuration examples.

Figure 1A:
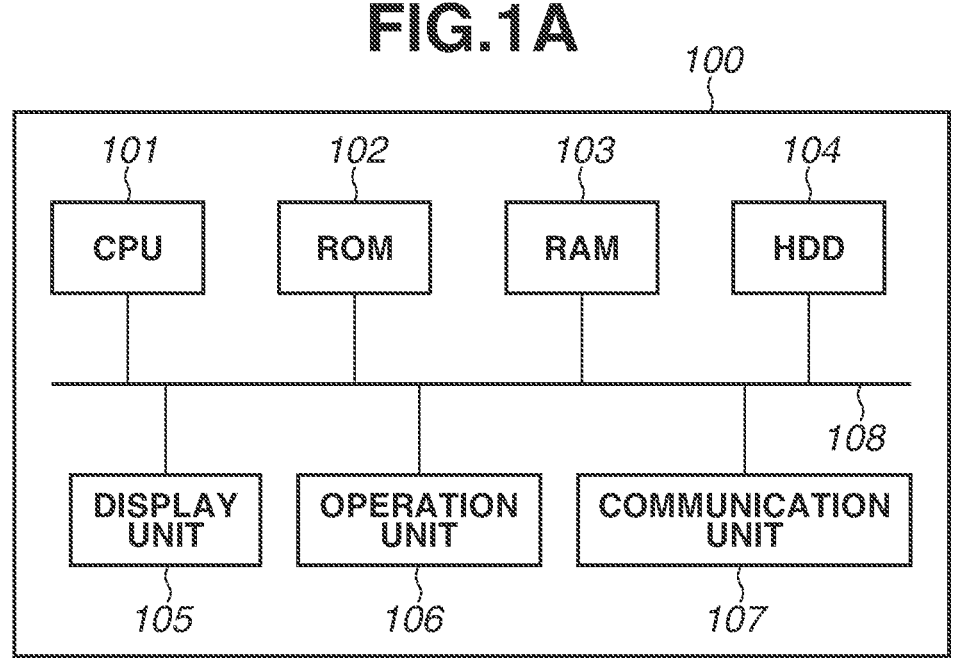
FIGS. 1A and 1B are block diagrams respectively illustrating examples of a hardware configuration and a functional configuration of an information processing apparatus according to a first exemplary embodiment.
Figure 1B:
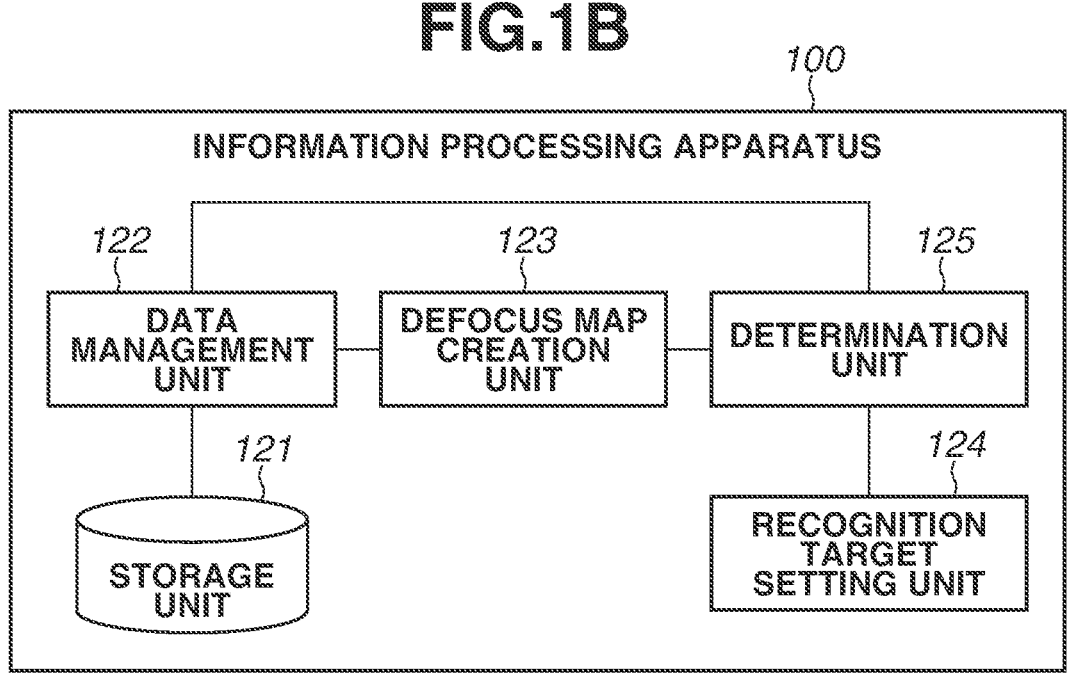

FIGS. 1A and 1B are block diagrams respectively illustrating examples of a hardware configuration and a functional configuration according to a first exemplary embodiment. FIGS. 2A to 2E are diagrams used to describe an outline of information processing according to the present exemplary embodiment.

In the following exemplary embodiments, an example is described where a range in which a recognition target is recognizable within a captured image is determined by using a defocus map representing a distribution of defocus values as a map representing a degree of focus corresponding to a captured image of an inspection target. In particular, in the present exemplary embodiment, an example of an information processing system for performing a so-called infrastructure inspection for checking aged deterioration of a structure, such as a bridge.

First, the terms used to describe the present exemplary embodiment are defined below. The definitions of the terms described below are examples where the information processing apparatus according to the present exemplary embodiment is applied to an infrastructure inspection for checking, for example, a concrete structure.

The "inspection target" is, for example, a concrete structure on which the infrastructure inspection is carried out.

The "recognition target" is, for example, a crack, delamination, or peeling of concrete in a concrete structure, efflorescence, reinforcing steel exposure, rust, water leakage, water dripping, corrosion, damage, a cold joint, a deposit, or a honeycomb.

The term "recognition processing" refers to processing of recognizing the recognition target by a pattern recognition method or the like in the captured image of the inspection target. For example, when the recognition target is a crack in a concrete structure, the crack is recognized from the captured image in the recognition processing.

The term "determination processing" refers to processing of determining a range in which the recognition target can be recognized by recognition processing from the captured image of the inspection target. The determination processing according to the present exemplary embodiment will be described in detail below.

The term "user" refers to an inspector who performs an inspection to, for example, check whether the recognition target, such as a crack, exists on a surface through visual observation of the captured image of the inspection target, such as a concrete structure.

The term "defocus" refers to a degree of focus (defocusing) on a subject surface at a time of image capturing when an image of a subject (a concrete structure or a part of the concrete structure in the case of performing an infrastructure inspection) is captured. The degree of focus is represented by a value (defocus value). For example, the defocus value "0" represents a state where the subject surface is in focus, and a defocus value other than "0" represents a state where defocusing has occurred. A defocus value is represented by a plus or minus value. A minus defocus value represents a state (front focus) where a location on the front side of the subject surface is in focus, and a plus defocus value represents a state (rear focus) where a location in a depth direction of the subject surface is in focus. In the present exemplary embodiment, the defocus value is used as a value representing the degree of blur due to defocusing in the captured image of the subject.

Prior to detailed description of the configuration of the information processing apparatus according to the present exemplary embodiment illustrated in FIGS. 1A and 1B, the outline of information processing according to the present exemplary embodiment will be described with reference to FIGS. 2A to 2E. In the following description, a bridge made of concrete is used as the "inspection target" for the infrastructure inspection and each crack on the surface of the bridge is inspected as the "recognition target".

Figure 2A:
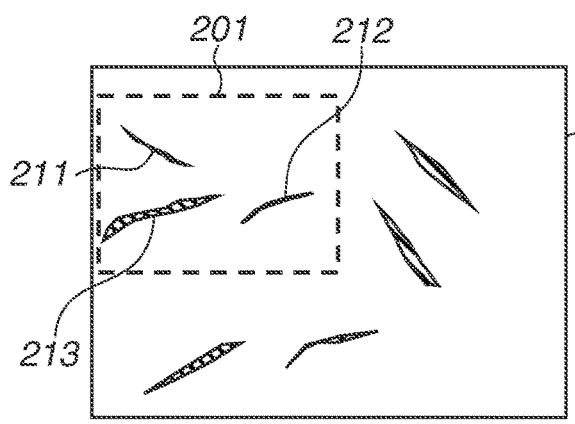
FIGS. 2A to 2E are diagrams used to describe an outline of information processing according to the first exemplary embodiment.

FIG. 2A illustrates a captured image 200 of the wall surface of the bridge. Assume that a plurality of cracks, such as cracks 211, 212, and 213, is captured in the image 200. The image 200 is an image captured with a high resolution so that the image can be used for infrastructure inspection. The image 200 is a large image, for example, with a size of 10,000 pixels×20,000 pixels.

In a case where each crack is inspected using the captured image 200 of the surface of the bridge, it may be necessary to determine whether each crack can be recognized by the recognition processing on the image 200. Conventionally, the user determines whether each crack can be recognized by the recognition processing by checking the degree of focus through visual observation during capturing of the image 200.

Figure 2B:
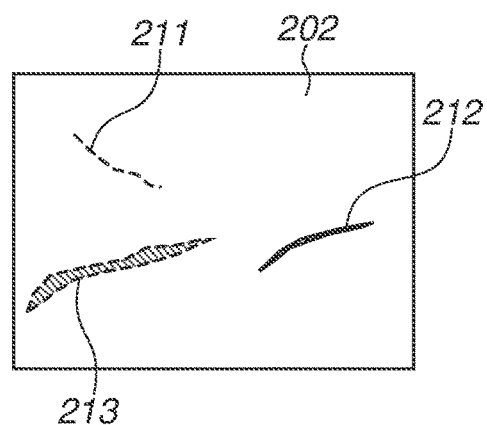

FIG. 2B illustrates an image 202 in which, for example, a range 201 including the cracks 211, 212, and 213 is enlarged in the image 200 illustrated in FIG. 2A. In the image 202 that is the enlarged image of the range 201, the cracks 211 and 213 are blurred due to focus error, while the crack 212 is in focus and thus is not blurred so much. In FIG. 2B, the blurred cracks 211 and 213 are each illustrated by a dashed line. In the image 202 illustrated in FIG. 2B, it can be confirmed that the crack 212 is in focus and the cracks 211 and 213 are not in focus. In addition, the crack 211 is a narrow crack and is blurred, which makes it difficult for the user to visually observe the crack 211 in the image 202. Accordingly, there is a possibility that the crack 211 cannot be recognized by the recognition processing. On the other hand, the crack 213 is blurred, but is a wide crack with a certain width, which enables the user to visually observe the crack 213 in the image 202. Accordingly, it is highly likely that the crack 213 can be recognized by the recognition processing.

Thus, the user determines whether each crack can be recognized by the recognition processing while enlarging the image and checking the degree of blur due to defocusing and the size (e.g., the width) of each crack. However, in order to determine whether each crack can be recognized by the recognition processing on the entire image, there may be a need to repeatedly perform the operation of enlarging a part of the image to check each crack on the entire image, which takes a lot of time and labor.

Accordingly, an information processing apparatus 100 according to the present exemplary embodiment performs processing for determining whether each crack can be recognized by the recognition processing on the captured image. The information processing apparatus 100 according to the present exemplary embodiment generates a defocus map representing a distribution of defocus values corresponding to the captured image, and performs processing of determining a range in which each crack can be recognized by the recognition processing on the captured image based on the defocus map.

Figure 2C:
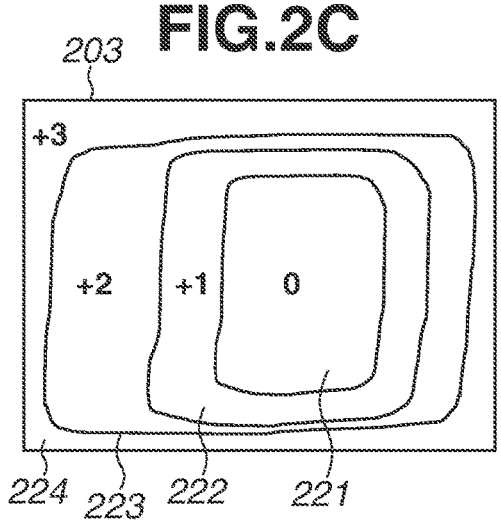

FIG. 2C is a diagram illustrating a defocus map 203 corresponding to the captured image 200 of the inspection target. As a method for creating the defocus map, for example, a method of calculating a defocus value for each pixel of an image and creating a defocus map representing a distribution of defocus values as discussed in Japanese Patent Application Laid-Open No. 2019-134431 can be used. Regions 221 to 224 illustrated in FIG. 2C are regions representing different defocus values, respectively. The region 221 is a region with the defocus value "0". The region 222 is a region with the defocus value "+1". The region 223 is a region with the defocus value "+2". The region 224 is a region with the defocus value "+3". The information processing apparatus 100 executes determination result generation processing of determining a range in which each crack can be recognized by the recognition processing on the image 200 based on the defocus values at each position on the defocus map 203 and of generating the determination result. Further, the information processing apparatus 100 displays, on a screen of a display device, the determination result obtained by the determination result generation processing and the image 200 obtained by image capturing in association with a positional relationship in such a manner that the determination result is superimposed on the image 200, and presents the determination result and the image 200 to the user.

Figure 2D:
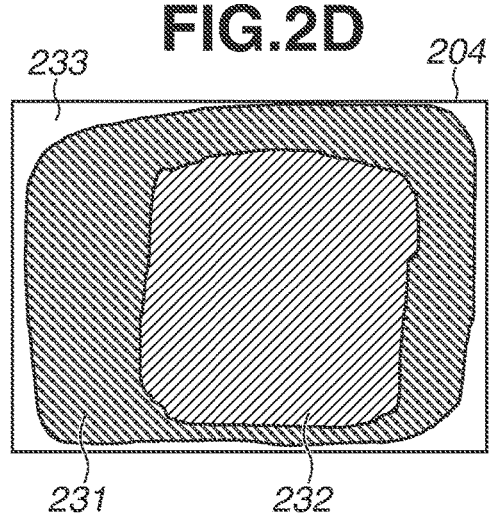

FIG. 2D illustrates a display example of a determination result 204 obtained by visualizing the result of processing of determining the range in which each crack can be recognized by the recognition processing. In FIG. 2D, a region 231 represents a range in which a wide crack can be recognized by the recognition processing. A region 232 represents a range in which not only a wide crack but also a fine crack can be recognized by the recognition processing. On the other hand, a region 233 represents a range in which neither a wide crack nor a fine crack can be recognized by the recognition processing.

Further, in the information processing apparatus 100 according to the present exemplary embodiment, the determination result 204 illustrated in FIG. 2D is displayed in such a manner that the determination result 204 is superimposed on the image 200.

Figure 2E:
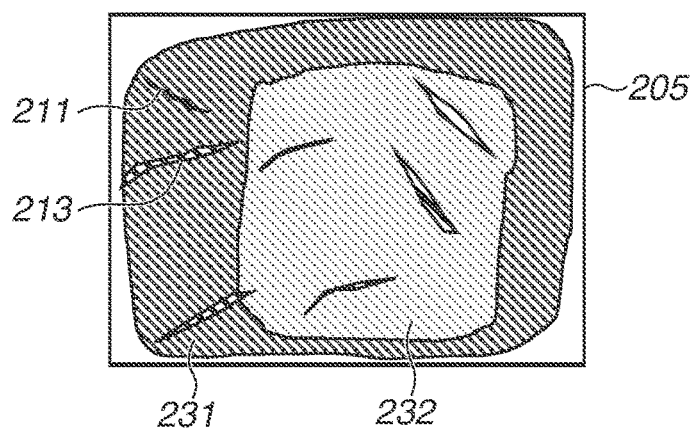

FIG. 2E illustrates an example of an image 205 obtained by superimposing the determination result 204 on the image 200. Through visual observation of the image 205, the user can check the range in which each crack can be recognized by the recognition processing for each width of cracks. For example, the fine crack 211 is located outside the region 232 representing the range in which a fine crack can be recognized, and thus the user can determine that it is difficult to recognize the crack by the recognition processing. On the other hand, the wide crack 213 is located within the region 231 representing the range in which a wide crack can be recognized, and thus the user can determine that the crack can be recognized by the recognition processing. In the information processing apparatus 100 according to the present exemplary embodiment, the user can easily check the range in which each crack can be recognized by the recognition processing at each position in the image 200 by displaying the image 205 on which the determination result is superimposed as described above.

FIG. 1A is a block diagram illustrating a hardware configuration of the information processing apparatus 100 according to the first exemplary embodiment. As illustrated in FIG. 1A, the information processing apparatus 100 includes a central processing unit (CPU) 101, a read-only memory (ROM) 102, a random access memory (RAM) 103, a hard disk drive (HDD) 104, a display unit 105, an operation unit 106, and a communication unit 107.

The CPU 101 performs calculations and logical judgements for various processing, and controls components connected to a system bus 108.

The ROM 102 is a program memory that stores control programs used by the CPU 101 to execute and control various processing procedures.

The RAM 103 is used as a temporary storage area, such as a main memory or a work area, for the CPU 101. The program memory may be implemented by loading a program to the RAM 103 from an external storage device or the like connected to the information processing apparatus 100.

The HDD 104 includes a hard disk for storing programs used for the CPU 101 to execute various processing, including processing of creating the defocus map according to the present exemplary embodiment and determination processing, various setting information, and various data, such as image data, and a drive device for driving the hard disk. The programs according to the present exemplary embodiment may be stored in the ROM 102. In addition, an external storage device may be used as a device having the same function as the HDD 104. The external storage device can be implemented using, for example, media (recording media) and an external storage drive for implementing an access to the media. As the media, for example, a flexible disk (FD), a compact disc (CD)-ROM, a digital versatile disc (DVD), a universal serial bus (USB) memory, a magneto-optical disk (MO), and a flash memory are known. The external storage device may be a service device or the like connected via a network.

The display unit 105 includes, for example, a display device, such as a cathode-ray tube (CRT) display or a liquid crystal display, and a display control function for controlling the display of the display device. The display unit 105 displays, on the display device, an image generated by the CPU 101 or an image read out from the HDD 104. The display control function may be implemented by the CPU 101, and the display unit 105 may be only the display device. The display device on which images and the like are displayed may be an external display device that is connected to the information processing apparatus 100 by a wired connection or a wireless connection.

The operation unit 106 includes an operation device, such as a keyboard, a mouse, and/or a touch panel, and an operation information reception function for receiving each operation information output from the operation device in response to a user operation.

The communication unit 107 performs bidirectional communication with another information processing apparatus, a communication device, an external storage device, or other devices by wired communication or wireless communication using a known communication technique.

FIG. 1B is an example of a functional block diagram illustrating a functional configuration of the information processing apparatus 100. The information processing apparatus 100 according to the present exemplary embodiment includes functional units of a storage unit 121, a data management unit 122, a defocus map creation unit 123, a recognition target setting unit 124, and a determination unit 125. These functional units are configured by the CPU 101 loading the programs according to the present exemplary embodiment stored in the HDD 104 or the ROM 102 into the RAM 103 and executing the loaded programs. Further, in the information processing apparatus 100 according to the present exemplary embodiment, processing in each flowchart to be described below is executed by each functional unit. Results obtained by executing processing by each functional unit are held in the RAM 103, as needed. For example, when a hardware module is used in place of software processing that is implemented by the CPU 101, a calculation unit or circuit configured to perform the processing to be executed by each functional unit described herein may be used.

The storage unit 121 stores at least an image of an inspection target captured by an image capturing device, and model information used when the determination processing of determining the range in which recognition processing can be performed on the recognition target. The captured image of the inspection target is an image used for determination processing according to the present exemplary embodiment. The model information stored in the storage unit 121 includes information about a trained model. The trained model will be described in detail below.

The data management unit 122 manages the captured image, model information, and the like that are stored in the storage unit 121. In the present exemplary embodiment, in a case of performing determination processing for determining the range in which recognition processing can be performed on the recognition target in the captured image, the data management unit 122 reads out the captured image of the inspection target from the storage unit 121, and transfers the image to each of the defocus map creation unit 123 and the determination unit 125.

The defocus map creation unit 123 calculates defocus values at respective positions of pixels in the captured image by the method, for example, discussed in Japanese Patent Application Laid-Open No. 2019-134431, and creates a defocus map representing a distribution of defocus values at respective positions of pixels. In this way, the defocus map creation unit 123 creates the defocus map corresponding to the captured image of the inspection target.

The recognition target setting unit 124 sets the recognition target based on an instruction input by the user through the operation unit 106, and sends the setting information about the recognition target to the determination unit 125. The recognition target setting processing to be executed in response to an instruction from the user will be described in detail below.

The determination unit 125 performs processing for determining the range in which recognition processing can be performed on the recognition target in the captured image based on the defocus map. The determination processing to be executed by the determination unit 125 will be described in detail below.

FIG. 3 is a flowchart illustrating a procedure of information processing in the information processing apparatus 100 according to the first exemplary embodiment. When a processing start instruction is input by the user through the operation unit 106, the information processing apparatus 100 according to the present exemplary embodiment starts the processing in the flowchart illustrated in FIG. 3.

In S301, the data management unit 122 reads out the captured image of the inspection target from the storage unit 121, and transfers the captured image to the defocus map creation unit 123.

The defocus map creation unit 123 calculates defocus values at respective positions of pixels based on the captured image, and creates a defocus map representing a distribution of defocus values for the respective pixels. As described above, the defocus map is a map representing a distribution of defocus values on a subject surface when an image of a subject as the inspection target is captured. The defocus map can be created by a known method, for example, the method discussed in Japanese Patent Application Laid-Open No. 2019-134431. The defocus map is not limited to raster data, and any data based on which a defocus value (defocus amount) at a specific position on an image can be calculated may be used. In the present exemplary embodiment, the defocus map is treated as raster data.

The defocus map is a map representing defocus values at position coordinates respectively corresponding to pixels of the captured image. It is difficult for the user to identify information about the defocus values merely by glancing at map data. For this reason, the defocus map creation unit 123 performs processing for visualizing the defocus values. As a method for visualizing the defocus map, for example, a method of presenting defocus values by grouping the defocus values depending on the position coordinates of pixels by using different colors or patterns for the respective defocus values can be used. The defocus map creation unit 123, by using different colors or patterns for the respective defocus values, visualizes each portion where the defocus values change as a boundary, and creates the defocus map in which a representative value for the defocus values is visualized in a region between boundaries.

Figure 4A:
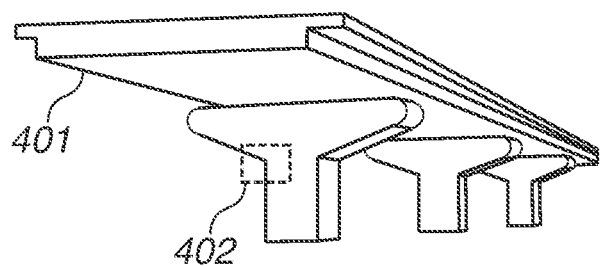
FIGS. 4A, 4B, and 4C are diagrams used to describe a defocus map.

An example of visualizing the defocus map will be described with reference to FIGS. 4A to 4C. In the present exemplary embodiment, assume that, as an example of an infrastructure inspection, an image of a wall surface of a concrete structure, such as a bridge 401 illustrated in FIG. 4A, is captured as the inspection target. It may be necessary to use an image captured with a high resolution in order to enable a fine crack or the like occurring in the wall surface to be recognized by the recognition processing.

Figure 4B:
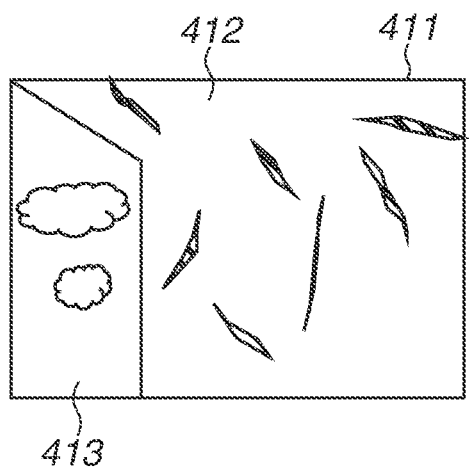
Figure 4C:
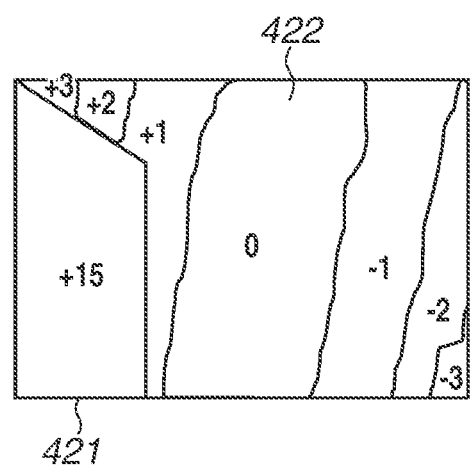

FIG. 4B illustrates an example of a captured image 411 of a wall surface 402, which is a part of the bridge 401, as the subject of the inspection target. A bridge wall surface 412 and a sky region 413 are captured in the image 411 illustrated in FIG. 4B. FIG. 4C illustrates an example of a defocus map 421 in which the defocus values corresponding to respective regions in the image 411 are visualized. Each value included in the defocus map 421 is a representative value for the defocus values in each region. The representative value for the defocus values in the region 422 is "0". The absolute value of the representative value for the defocus values increases toward the outside of the region 422. This indicates that the image 411 is an image in which a portion in the vicinity of the center of the image is in focus and the degree of blur due to focus error increases toward a peripheral portion. In a region far from the subject surface (wall surface of the bridge 401), like in the sky region 413, the degree of blur due to focus error increases, and thus the absolute value of the representative value for the defocus values increases.

Referring back to the flowchart in FIG. 3, the description of information processing is continued.

After S301, in S302, the recognition target setting unit 124 performs processing for setting the recognition target used to determine whether the recognition target can be recognized by the recognition processing in the captured image. When the concrete structure is inspected like in some embodiments, a crack, efflorescence, water leakage, or the like occurring on the concrete wall surface is set as the recognition target. In the present exemplary embodiment, the recognition target setting unit 124 sets, for example, the recognition target instructed by the user through a user interface (UI) screen as the recognition target. It is determined whether the recognition target can be recognized by the recognition processing.

Figure 5A:
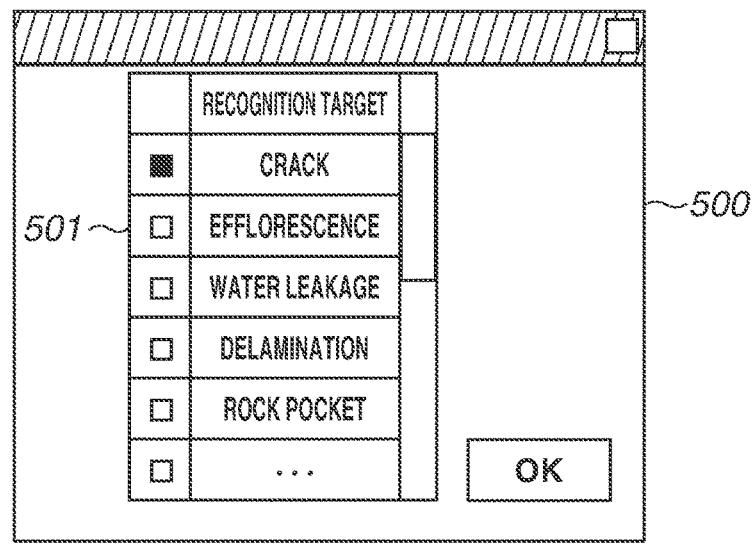
FIGS. 5A, 5B, and 5C are diagrams used to describe an example of setting a recognition target.
Figure 5B:
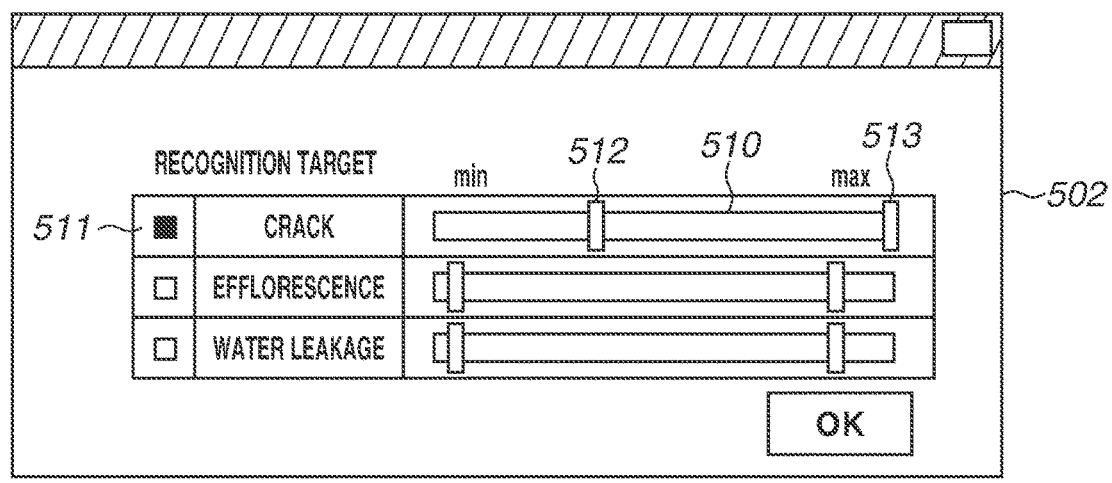
Figure 5C:
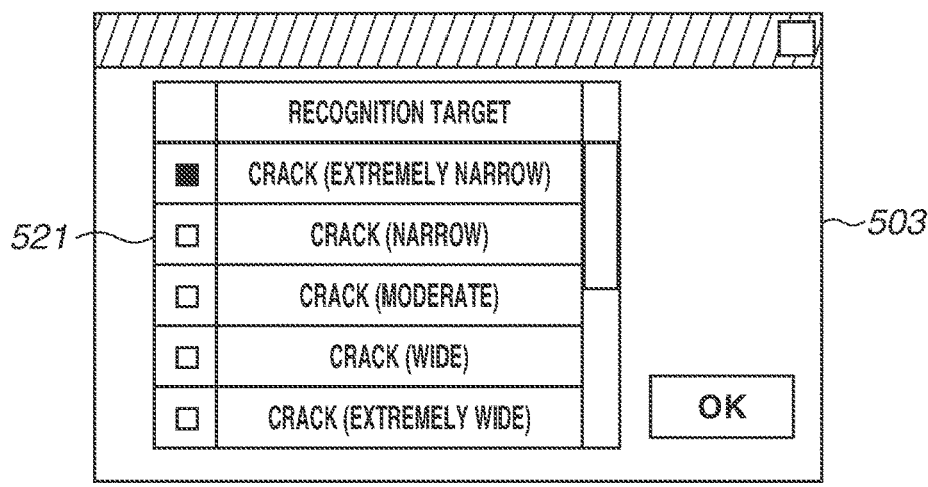

FIGS. 5A to 5C illustrate examples of the UI screen to be displayed when the recognition target is selected. Information to be displayed on these UI screens is generated by, for example, the CPU 101.

On a UI screen 500 illustrated in FIG. 5A, a recognition target list 501 in which a plurality of recognition targets, such as a crack, efflorescence, and water leakage, is arranged for each item is prepared. The recognition target list 501 is provided with checkboxes for the respective items. When the user puts a check in a desired checkbox through an operation on the operation unit 106, the recognition target setting unit 124 sets the recognition target corresponding to the checked item as the recognition target used to determine whether the recognition target can be recognized by the recognition processing.

In the present exemplary embodiment, as the deterioration of the concrete structure, which is an example of the inspection target, has advanced due to environmental factors or other factors, a crack, efflorescence, or the like occurring in the wall surface of the structure gradually increases in many cases. Accordingly, in a case of performing an inspection to diagnose the degree of degradation in the concrete structure, a large recognition target is particularly given weight. It may be desirable to enable setting the size of the recognition target (hereinafter referred to as the determination size), which is used to determine whether the recognition target can be recognized by the recognition processing, in consideration of a case where recognition processing in which the recognition target with a specific size is given weight is performed.

FIG. 5B illustrates an example of a UI screen 502 on which the determination size of the recognition target can be set. On the UI screen 502 illustrated in FIG. 5B, a recognition target list 511 in which a plurality of recognition targets is arranged for each item is prepared. The recognition target list 511 is provided with not only the checkboxes for the respective items, but also a slider bar 510. In the case of the UI screen 502, when the user puts a check in a checkbox through the operation unit 106, the recognition target setting unit 124 sets the recognition target corresponding to the checked item as the recognition target to be determined whether the recognition target can be recognized by the recognition processing. In the example of the UI screen 502 illustrated in FIG. 5B, the item "crack" is checked, and thus a crack is set as the recognition target.

When the slider bar 510 corresponding to the item of the recognition target (crack) is operated by the user through the operation unit 106, the recognition target setting unit 124 also sets the determination size of the recognition target based on operation information of the slider bar 510. The slider bar 510 is provided with a lower limit bar 512 and an upper limit bar 513. The user can slide at least one of the lower limit bar 512 and the upper limit bar 513 to any position through an operation on the operation unit 106. The recognition target setting unit 124 sets the determination size of the recognition target depending on the interval between the lower limit bar 512 and the upper limit bar 513. In this way, the size (e.g., the width of a crack) corresponding to the interval between the lower limit bar 512 and the upper limit bar 513 is set as the determination size of the recognition target to determine whether the recognition target can be recognized by the recognition processing.

Each of the lower limit bar 512 and the upper limit bar 513 can be operated by a slide operation within a slidable range of the slider bar 510. Alternatively, the slide operation of the lower limit bar 512 may be performed in conjunction with the slide operation of the upper limit bar 513. More specifically, for example, the interval between the lower limit bar 512 and the upper limit bar 513 may be held constant and the slide operation of one of the lower limit bar 512 and the upper limit bar 513 may be performed in conjunction with the slide operation of the other of the lower limit bar 512 and the upper limit bar 513. While the exemplary embodiment described above illustrates an example where a crack is set as the recognition target, the recognition target setting unit 124 can set the size of the recognition target also when the recognition target other than a crack is selected. The determination size of the recognition target other than a crack is set, for example, when an attribute for an area (area size) or the like of the recognition target is set.

FIG. 5B illustrates an example where the determination size of the recognition target can be set through an operation on the slider bar 510. However, for example, a recognition target list in which recognition targets are divided for each determination size may be displayed on a UI screen so that the user can select the recognition target of any size from the recognition target list. FIG. 5C illustrates an example of a UI screen 503 on which a recognition target list 521 in which recognition targets are divided for each determination size is displayed. The recognition target list 521 illustrated in FIG. 5C is an example of a list in which cracks are grouped depending on the size of each crack. The recognition target list 521 is also provided with checkboxes for the respective items as described above. The recognition target setting unit 124 sets the recognition target and the determination size of the recognition target based on a user selection operation of putting a check in a checkbox in the recognition target list 521 on the UI screen 503 illustrated in FIG. 5C.

Referring back to the flowchart in FIG. 3, the description of information processing is continued.

After S302, in S303, the determination unit 125 performs processing of determining the range in which recognition processing can be performed on the recognition target set by the recognition target setting unit 124 in the captured image of the inspection target. In the present exemplary embodiment, the determination unit 125 acquires the defocus map from the defocus map creation unit 123, and outputs the determination result corresponding to each position on the defocus map. The determination processing in the determination unit 125 according to the present exemplary embodiment will be described with reference to FIGS. 6A to 6F.

The determination unit 125 determines the range in which recognition processing can be performed on the recognition target in the captured image based on the defocus values at respective positions on the defocus map. The determination processing based on defocus values at respective positions on the defocus map can be represented by statement (1).

$$Dt1 \leq Di \leq Dt2 \quad (1)$$

The parameter Di (defocus value Di) used in statement (1) is a defocus value at a position "i" of a pixel of interest on the defocus map. The parameters Dt1 and Dt2 are defocus reference values each representing a boundary used when it is determined whether recognition processing can be performed on the recognition target. The parameter Dt1 is a lower limit of the defocus reference value, and the parameter Dt2 is an upper limit of the defocus reference value. In other words, in the present exemplary embodiment, the defocus reference value has a width between the lower limit and the upper limit. The parameters Dt1 and Dt2 may be, for example, experimentally obtained values, or values designated by the user.

FIG. 6A illustrates, as examples of the defocus reference values, defocus reference values 601 for each crack size (crack width) when a crack is set as the recognition target. As illustrated in FIG. 6A, in the present exemplary embodiment, the upper limit and the lower limit, which are varied depending on the crack size (width), are determined for each defocus reference value.

Determination processing of determining whether recognition processing can be performed on a narrow crack, which is set as the recognition target, will now be described as an example of determination processing using the defocus reference value 601 illustrated in FIG. 6A and statement (1).

In this case, the determination unit 125 acquires the lower limit and the upper limit of the defocus reference value corresponding to the narrow crack from the defocus reference values 601. In the defocus reference value 601 illustrated in FIG. 6A, the lower limit of the defocus reference value corresponding to the narrow crack is "−1", and the upper limit of the defocus reference value corresponding to the narrow crack is "+1". Accordingly, the determination unit 125 acquires "−1" as the parameter Dt1 and acquires "+1" as the parameter Dt2.

Next, the determination unit 125 acquires the defocus value Di at the position "i" of the pixel of interest on the defocus map. When the defocus value Di acquired at the position "i" is substituted in statement (1) and statement (1) is satisfied, the determination unit 125 determines that the narrow crack can be recognized at the position "i". When statement (1) is not satisfied, the determination unit 125 determines that the narrow crack cannot be recognized. The determination unit 125 performs determination processing using statement (1) at all positions "i" on the defocus map while sequentially changing the position "i" of the pixel of interest. In this way, the determination unit 125 can acquire the determination result for the narrow crack at all positions "i" on the defocus map.

The determination processing using the defocus reference value and statement (1) as described above can also be applied to a case where a plurality of recognition targets is set. For example, when two recognition targets (e.g., a medium crack and an extremely narrow crack) are set by the recognition target setting unit 124, the determination unit 125 selects the medium crack as a first recognition target. Further, the determination unit 125 acquires the lower limit and the upper limit of the defocus reference value corresponding to the medium crack. In the defocus reference values 601 illustrated in FIG. 6A, the lower limit of the defocus reference value corresponding to the medium crack is "−2" and the upper limit of the defocus reference value corresponding to the medium crack is "+2". Accordingly, the determination unit 125 acquires "−2" as the parameter Dt1 and acquires "+2" as the parameter Dt2. Further, the determination unit 125 determines whether the defocus values at respective positions on the defocus map satisfy statement (1), thereby obtaining the determination result for the entire defocus map. Upon completion of the determination processing on the medium crack, the determination unit 125 then selects the extremely narrow crack as a second recognition target. In the defocus reference values 601 illustrated in FIG. 6A, the lower limit and the upper limit of the defocus reference value corresponding to the extremely narrow crack are "0". Accordingly, the determination unit 125 acquires "0" as each of the parameters Dt1 and Dt2. Then, in the same manner as described above, the determination unit 125 determines whether the defocus values at respective positions on the defocus map satisfy statement (1), thereby obtaining the determination result for the entire defocus map.

In the determination processing to be executed by the determination unit 125, for example, a trained model obtained by machine learning can be used. In this case, the trained model to be used is a trained model obtained by machine learning using a pair of the defocus map and supervisory data indicating whether the recognition target at each position on the defocus map can be determined as learning data. The trained model is a model for outputting one of information indicating that the recognition target can be recognized and information indicating that the recognition target cannot be recognized by using the defocus map as input data. For example, the trained model can be configured using a neural network model.

FIG. 6B illustrates an example of trained models 602 for respective crack sizes (widths). In a case of performing determination processing using the trained models 602, the determination unit 125 selects any one of the trained models 602 based on the recognition target set by the recognition target setting unit 124. For example, when a wide crack is set as the recognition target in the recognition target setting unit 124, a model M2 for a wide crack set as the recognition target is selected from among the trained models 602. The determination unit 125, by using the model M2 selected as described above as a classifier, classifies (i.e., determines) whether the wide crack can be recognized with the defocus map as an input. Further, the determination unit 125 outputs the determination result for the wide crack at each position on the defocus map by the determination processing.

The example in which the trained models are used can also be applied to a case where a plurality of recognition targets is set by the recognition target setting unit 124. For example, when two recognition targets (an extremely wide crack and a narrow crack) are set by the recognition target setting unit 124, the determination unit 125 selects the extremely wide crack as the first recognition target. Next, the determination unit 125 selects, as a classifier, a model M1 for the extremely wide crack set as the recognition target from among the trained models 602. Then, the determination unit 125 performs determination processing on the input of the defocus map. Upon completion of the determination processing, the determination unit 125 selects the narrow crack as the second recognition target, and then repeats the model selection and the determination processing in the same manner as described above. Also, when the number of recognition targets is increased, the same processing may be carried out.

In the present exemplary embodiment, as a method for selecting a model used as a classifier, the user may directly select a model from a model list. In a case where the user selects a model, the determination unit 125 acquires the model designated by the user from the data management unit 122, and then performs determination processing. The above-described trained models may be updated, as needed, after predetermined processing is performed.

In the exemplary embodiment described above, a method for performing determination processing using the trained models and the defocus reference values for respective recognition target sizes, such as a crack width. Alternatively, a common trained model or defocus reference value may be used regardless of the size of each recognition target. For example, trained models for respective recognition targets as illustrated in FIG. 6C and defocus reference values illustrated in FIG. 6D are prepared in advance. Further, the determination unit 125 may select a trained model and a defocus reference value depending on the recognition target set by the recognition target setting unit 124. More alternatively, a common trained model or defocus reference value may be used regardless of the type of each recognition target.

In the present exemplary embodiment described above, the description is given of an example in which the same determination processing is performed at all positions on the entire defocus map. Alternatively, the determination processing may be performed by different methods for respective divided regions obtained by, for example, dividing the defocus map into regions, each of which is larger than a pixel unit. In the case of dividing the defocus map into regions, for example, the defocus map may be divided into segment regions based on defocus values, and the determination processing may be performed using different trained models for the respective segment regions as classifiers.

FIG. 6E illustrates a defocus map 611 including, for example, two defocus values "+8" and "0", which are greatly different from each other. FIG. 6F illustrates trained models 621 for the respective defocus values. The defocus map 611 illustrated in FIG. 6E is divided into a segment region 612 and a segment region 613 based on defocus values. Each trained model 621 illustrated in FIG. 6F is a trained model obtained using a pair of a specific defocus value on the defocus map and training data on the determination result as learning data. Further, the determination unit 125 performs crack determination processing using the defocus map 611 as an input and the trained model 621 as a classifier. In this case, the determination unit 125 divides the defocus map 611 into the segment regions 612 and 613, and selects a model from the trained models 621 based on the defocus values for the segment regions 612 and 613, respectively, to perform the determination processing. Specifically, in this example, the defocus value for the segment region 612 is "0", and thus the determination unit 125 selects a model M21, and the defocus value for the segment region 613 is "+8", and thus the determination unit 125 selects a model M22. Further, the determination unit 125 performs determination processing using the trained model suitable for each segment region depending on the defocus value.

In addition, as another example of performing determination processing by different methods for the respective segment regions of the defocus map, a determination method using a trained model as a classifier for each segment region may be used together with a determination method using the defocus reference values and statement (1).

Referring back to the flowchart in FIG. 3, the description of information processing is continued.

After S303, in S304, the information processing apparatus 100 creates display data for displaying the determination result obtained by the determination unit 125, and displays the created display data. The display data creation processing is performed by the CPU 101. After completion of the display of the determination result, the information processing apparatus 100 according to the present exemplary embodiment terminates the processing in the flowchart illustrated in FIG. 3.

In the present exemplary embodiment, in the case of displaying the determination result, the determination result can be displayed by, for example, a method in which defocus values are grouped using different colors or patterns (colors or patterns different from those used in the defocus map), like in the example in which the defocus map is visualized as illustrated in FIG. 2D. As a result, a portion where the determination result changes is visualized as a boundary depending on the difference between colors or patterns. Further, in the present exemplary embodiment, when the determination processing is performed on each of the plurality of recognition targets, the determination result is visualized using different colors or patterns for the respective recognition targets.

FIGS. 7A to 7E are diagrams illustrating a determination result display method.

FIG. 7A illustrates a determination result 701 obtained by visualizing the determination result when the determination processing is performed on each of the plurality of recognition targets, and illustrates an example of the determination result for a crack and efflorescence. In the determination result 701, a region 702 surrounded by a solid line represents the determination result for a crack, and a region 703 surrounded by a dashed line represents the determination result for efflorescence.

FIG. 7B illustrates an example in which a determination result image 711 obtained by superimposing the determination result 701 illustrated in FIG. 7A on the captured image is displayed on a screen 712. The display of the determination result image 711 obtained by superimposing the determination result 701 on the captured image as illustrated in FIG. 7B facilitates the user to check whether the recognition target can be recognized at each position in the captured image. The information processing apparatus 100 according to the present exemplary embodiment can also display a recognition target list 713 in which the recognition targets on which determination processing is performed are displayed as items on the screen 712 as illustrated in FIG. 7B. Each item in the recognition target list 713 is provided with a checkbox, and the information processing apparatus 100 displays the determination result image 711 obtained by superimposing the region representing the determination result for the checked recognition target on the captured image. In the case of FIG. 7B, the items "crack" and "efflorescence" in the recognition target list 713 are checked. Accordingly, both the region 702 representing the crack determination result and the region 703 representing the efflorescence determination result are displayed on the determination result image 711. For example, if the user intends to hide the display of the efflorescence determination result, the user may perform an operation of unchecking a checkbox 714 corresponding to the efflorescence item among the items of the recognition target list 713. In this way, in the information processing apparatus 100 according to the present exemplary embodiment, the display of the determination result can be turned on and off depending on the presence of a check in each checkbox of the recognition target list 713. In this way, the information processing apparatus 100 can create the determination result image 711 again based on a user operation and can execute the display processing on the screen 712 again, thereby making it possible to display only the determination result for a specific recognition target from among the determination results for the plurality of recognition targets.

As another display method, the information processing apparatus 100 according to the present exemplary embodiment can display a recognizable recognition target list at a specific position in an image.

For example, assume that the user performs an operation, such as a so-called mouse-over operation, on the screen 712 illustrated in FIG. 7B to place a tip of mouse cursor 716 at a position near a desired position 715 on the determination result image 711. In this case, the information processing apparatus 100 sets the position 715 as the position of interest based on the user operation, reads the determination result at the position of interest, generates a recognizable recognition target list as illustrated in FIG. 7C, and displays the recognizable recognition target list in a pop-up window or the like on the screen of the display unit 105.

Coordinates (x1, y1) of the position of interest illustrated in FIG. 7C are position coordinates in the horizontal direction (x-direction) and the vertical direction (y-direction) of the screen, for example, when an upper left vertex in the determination result image 711 is set as an origin (0, 0). The display of the recognition target list illustrated in FIG. 7C facilitates the user to check the recognizable recognition target list at a specific position in the determination result image 711. If the user intends to check the recognizable recognition target list at a different position, the user may change the position of the mouse cursor 716. In other words, the information processing apparatus 100 resets the position of interest based on the operation of changing the position of the mouse cursor 716 by the user as described above. Further, the information processing apparatus 100 reads the determination result at the changed position of interest, updates the recognizable recognition target list, and displays the updated recognizable recognition target list again.

In the present exemplary embodiment, as another example of displaying the determination result, the information processing apparatus 100 can display the summary of the determination result.

FIG. 7D illustrates an example in which the summary of the determination result is displayed. FIG. 7D illustrates a display example of the summary of a determination result 721 for each crack size (width). In the determination result 721, the term "recognizability rate" refers to an area ratio of a region determined that a crack therein can be recognized, to the entire area of the captured image. The term "determination summary" refers to a determination result indicating "OK" when the recognizability rate is high (e.g., 80% or more) and indicating "NG" when the recognizability rate is not high. The summary display as described above facilitates the user to check whether each recognition target can be determined on the image.

As another example of the display method, the information processing apparatus 100 can also display the size of each recognition target that is determined to be recognizable in a graph format as illustrated in FIG. 7E. In FIG. 7E, for example, a shaded area 731 in a graph representing a crack as the recognition target represents a result obtained by visualizing which size of cracks can be recognized based on the crack determination result. A lower end of the shaded area 731 corresponds to the lower limit of the size of the recognizable crack, and an upper end of the shaded area 731 corresponds to the upper limit of the size of the recognizable crack. The visualization processing as illustrated in FIG. 7E facilitates the user to check the recognizable size for each recognition target.

In the first exemplary embodiment, an example in which a trained model is used in determination processing to be executed by the determination unit 125. A modified example in which recognition determination processing is performed using a model that is not fully trained can also be included in the present exemplary embodiment. In this example, first, a trained model using a small amount of learning data is used as an initial model. Further, the determination unit 125 uses the initial model as a classifier, performs, using the defocus map as an input, determination processing on the recognition target set by the recognition target setting unit 124, and outputs the determination result. In addition, in this example, when the determination result is corrected by the user, a pair of the correction result and the defocus map is used as learning data, and the initial model is trained again by machine learning. By repeating the determination processing and model learning, a trained model with a high recognition determination performance can be created.

While in the present exemplary embodiment described above, an example is described where the range in which each recognition target, such as a crack, can be recognized is determined based on a captured image of an inspection target in an infrastructure inspection, the application of the information processing according to the present exemplary embodiment is not limited to a specific field. For example, the information processing according to the present exemplary embodiment can also be applied to, for example, an operation (appearance inspection) for checking a defect, such as a flaw, based on a captured image of a product in manufacturing facilities and the like. In the appearance inspection, it is determined whether the appearance of each product manufactured in manufacturing facilities and the like satisfies the required quality by image recognition processing using a captured image of each product. The application of the information processing according to the present exemplary embodiment to this inspection makes it possible to efficiently perform the user operation associated with the determination of the range in which a defect, such as a flaw, can be recognized based on a captured image of a product.

As described above, according to the first exemplary embodiment, it is possible to reduce the work load on the user by supporting the user operation for determining the range in which each recognition target, such as a crack, can be recognized based on a captured image of a subject of an inspection target, thereby enhancing the operating efficiency.

In the first exemplary embodiment, the description is given of an example where the range in which each recognition target can be recognized is determined in a captured image by using only the defocus map corresponding to the captured image. In an infrastructure inspection, dirt and the like accumulated on a wall surface of a concrete structure such as a bridge or a tunnel due to aged deterioration causes the texture in the captured image to be complicated in many cases. If the texture is complicated, it is difficult for the user to visually observe a crack or the like on the wall surface. Accordingly, even when an in-focus image is used, it may possibly be difficult for the user to visually observe a crack or the like.

For this reason, an information processing apparatus according to a second exemplary embodiment generates data obtained by performing predetermined image processing on a captured image as additional data related to the texture of the image when determination processing is performed on the captured image including the complicated texture. Further, the information processing apparatus according to the second exemplary embodiment performs determination processing based on the defocus map as described above and the additional data related to the texture of the image. In this way, the information processing apparatus according to the second exemplary embodiment performs determination processing using the additional data related to the texture of the image, thereby making it possible to perform determination processing with high accuracy while reducing the occurrence of an erroneous determination of the range in which each recognition target can be recognized even in the captured image including the complicated texture. The information processing apparatus according to the present exemplary embodiment performs, as predetermined image processing on the captured image, processing of extracting an image feature amount and generating map data including the image feature amount as additional data. More specifically, in the second exemplary embodiment, for example, fast Fourier transform (FFT) processing is performed on the captured image to extract only high-frequency components in the captured image, and map data including only the high-frequency components is generated as the additional data related to the texture of the captured image.

Differences between the information processing apparatus according to the second exemplary embodiment and the information processing apparatus according to the first exemplary embodiment are mainly described below.

The hardware configuration of the information processing apparatus according to the second exemplary embodiment is similar to the hardware configuration illustrated in FIG. 2A, and thus the description thereof is omitted.

Figure 8:
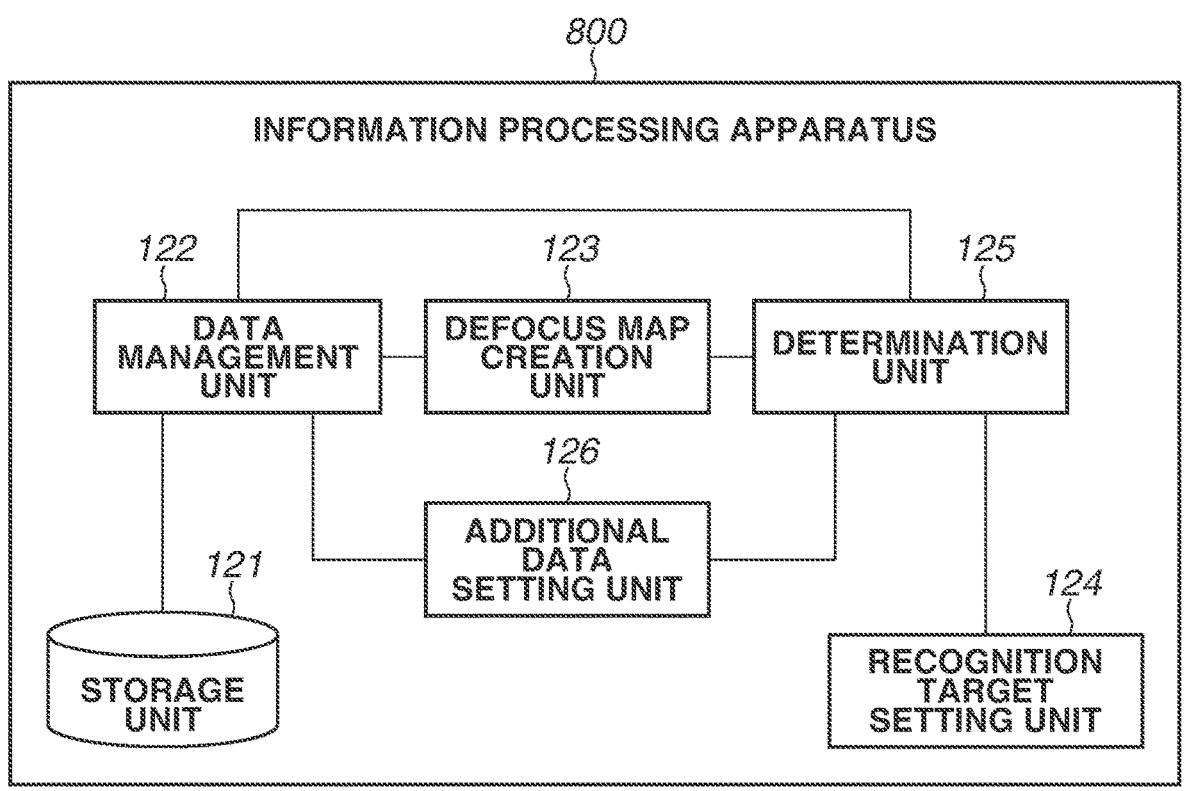
FIG. 8 is a block diagram illustrating an information processing apparatus according to a second exemplary embodiment.

FIG. 8 is an example of a functional block diagram illustrating a configuration of an information processing apparatus 800 according to the second exemplary embodiment. The configuration illustrated in FIG. 8 differs from the configuration illustrated in FIG. 2B according to the first exemplary embodiment in that the information processing apparatus 800 is provided with an additional data setting unit 126. The additional data setting unit 126 is a functional unit to be executed by the CPU 101, and performs additional setting processing for setting additional data used for determination processing in the second exemplary embodiment. In the functional blocks illustrated in FIG. 8, functional units other than the additional data setting unit 126 are similar to the functional units illustrated in FIG. 2A, and thus the descriptions thereof are omitted.

FIG. 9 is a flowchart illustrating a procedure of information processing in the information processing apparatus 800 according to the second exemplary embodiment. In the flowchart illustrated in FIG. 9, the processing operations denoted by the same numbers as those in the flowchart illustrated in FIG. 3 according to the first exemplary embodiment are similar to the processing operations executed in the first exemplary embodiment, and thus the descriptions thereof are omitted.

In the second exemplary embodiment, the recognition target is set in S302, and then the processing proceeds to S901. In S901, the additional data setting unit 126 sets map data including only high-frequency components and obtained by performing FFT processing on the captured image as described above as the additional data related to the texture of the captured image.

Next, in S902, the determination unit 125 executes the processing of determining the range in which the recognition target can be recognized by using the defocus map calculated in S301 and the additional data (map data including only high-frequency components of the captured image) set in S901. After that, in S304, the information processing apparatus 100 causes the display unit 105 to display the determination result.

The additional data setting processing in S901 will be described with reference to FIGS. 10A and 10B.

Figure 10A:
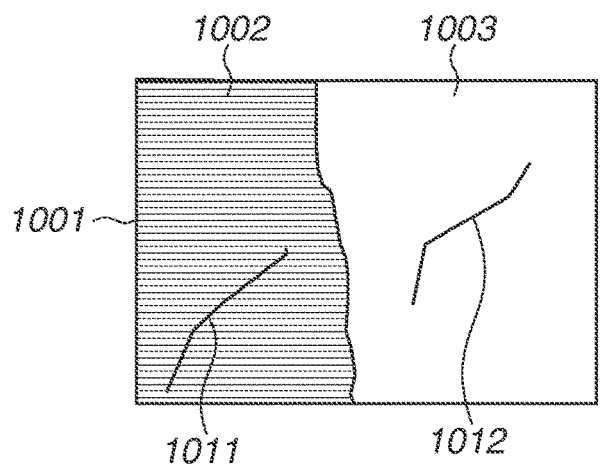
FIGS. 10A to 10C are diagrams used to describe determination processing using an image and a defocus map.

FIG. 10A illustrates an example of a captured image 1001 of the structure wall surface, which has further deteriorated. In the image 1001, a region 1002 indicates a state where a crack 1011 cannot be visually observed easily due to dirt on the wall surface. On the other hand, a region 1003 indicates a state where a crack 1012 can be visually observed easily since the wall surface is less dirty.

Figure 10B:
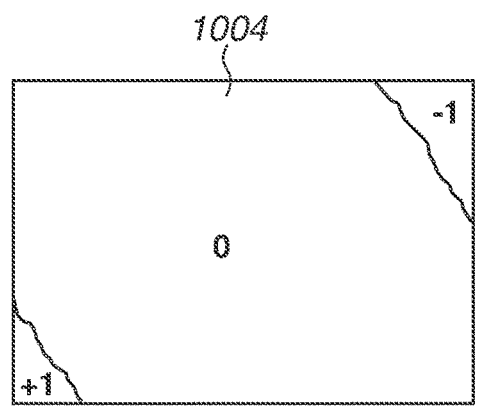

FIG. 10B illustrates a defocus map 1004 corresponding to the image 1001 illustrated in FIG. 10A. Assume that most of the defocus values in the defocus map 1004 are "0". Accordingly, the image 1001 is a wholly in-focus image. Although the defocus map 1004 includes information about defocus values on the subject surface, the defocus map 1004 does not include information about the texture of the subject surface.

Therefore, the additional data setting unit 126 performs FFT processing on the image 1001 to extract high-frequency components, creates map data including only the high-frequency components, and sets the map data as the additional data related to the texture of the image 1001.

As the additional data, not only the map data including only high-frequency components, but also, for example, an edge map corresponding to the captured image may be used. In the case of generating the edge map, the additional data setting unit 126 extracts edge contour components from the captured image, and sets map data including the edge contour components as additional data. Examples of processing for extracting edge contour components from the image include processing using the so-called Canny's method. As another example, RGB image data of three channels of red (R), green (G), and blur (B) in captured image data can be set as additional data.

Next, the determination processing to be executed by the determination unit 125 in S902 by using the defocus map and the additional data will be described.

In the determination processing on the recognition target, the determination unit 125 can use a trained model obtained by machine learning as a classifier used in determination processing, like in the first exemplary embodiment. The trained model used in the second exemplary embodiment is a trained model that is obtained by using the defocus map and additional data as inputs and being caused to learn a pair of supervisory data indicating the determination result at each position on the defocus map as learning data. This trained model can be configured using, for example, a neural network model. A method for selecting each model, a method for outputting results, and the like are similar to those in the first exemplary embodiment, and thus the descriptions thereof are omitted.

In the second exemplary embodiment also, the determination processing may be performed using a model that is not fully trained, like in the first exemplary embodiment described above. In this case, an initial model trained using a small amount of learning data is prepared as an initial model, and the determination processing on each recognition target is performed using the defocus map and the additional data as inputs. If the user corrects the determination result, the initial model is trained again by machine learning using a pair of the correction result and the defocus map as learning data. By repeating the determination processing and the model learning, a model with a high determination performance can be created.

Figure 10C:
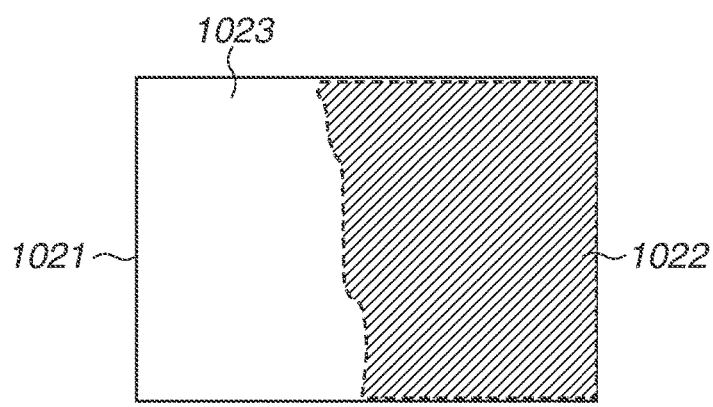

FIG. 10C illustrates an example of a determination result 1021 obtained by visualizing a determination result determined by determination processing executed by the determination unit 125 according to the second exemplary embodiment on a crack, which is set as the recognition target, in the image 1001 illustrated in FIG. 10A.

In the determination result 1021 illustrated in FIG. 10C, a region 1022 is a region determined that a crack therein can be recognized, while a region 1023 is a region determined that a crack cannot be recognized therein. Most of the defocus values at positions in the region 1022 and the region 1023 are "0" as indicated by the defocus map 1004 illustrated in FIG. 10B. Thus, both the regions 1022 and 1023 are almost in focus. In the second exemplary embodiment, the determination processing is performed using not only the defocus map 1004, but also the additional data related to the texture of the captured image, thereby achieving the determination processing in consideration of the texture of the captured image. In this way, in the determination processing according to the second exemplary embodiment, the region 1023 can be appropriately determined to be a region in which a crack cannot be recognized. In other words, according to the second exemplary embodiment, it is possible to perform the determination processing in consideration of the texture of the image even when the subject surface in the captured image is dirty.

In general, the image that is determined to bean image in which each recognition target cannot be recognized at each position in the captured image by the determination processing according to the first and second exemplary embodiments described above is not suitable for recognition processing. In this case, it may be necessary to perform an image capturing operation again to acquire another image. However, it takes a lot of time and labor for performing the image capturing operation to capture an image of a wall surface of infrastructure with a high resolution.

Accordingly, in a third exemplary embodiment, if the captured image is not suitable for recognition processing, predetermined image processing is performed on image data to be used for determination processing, and the determination processing is performed again using the image data having been subjected to the image processing. As a result of performing the determination processing again, as the range in which a recognition target can be recognized in the captured image increases, the possibility of using the captured image as an image suitable for recognition processing increases. Examples of the predetermined image processing according to the third exemplary embodiment include processing of converting the contrast of the captured image. Differences between the third exemplary embodiment and the second exemplary embodiment are mainly described.

Figure 11A:
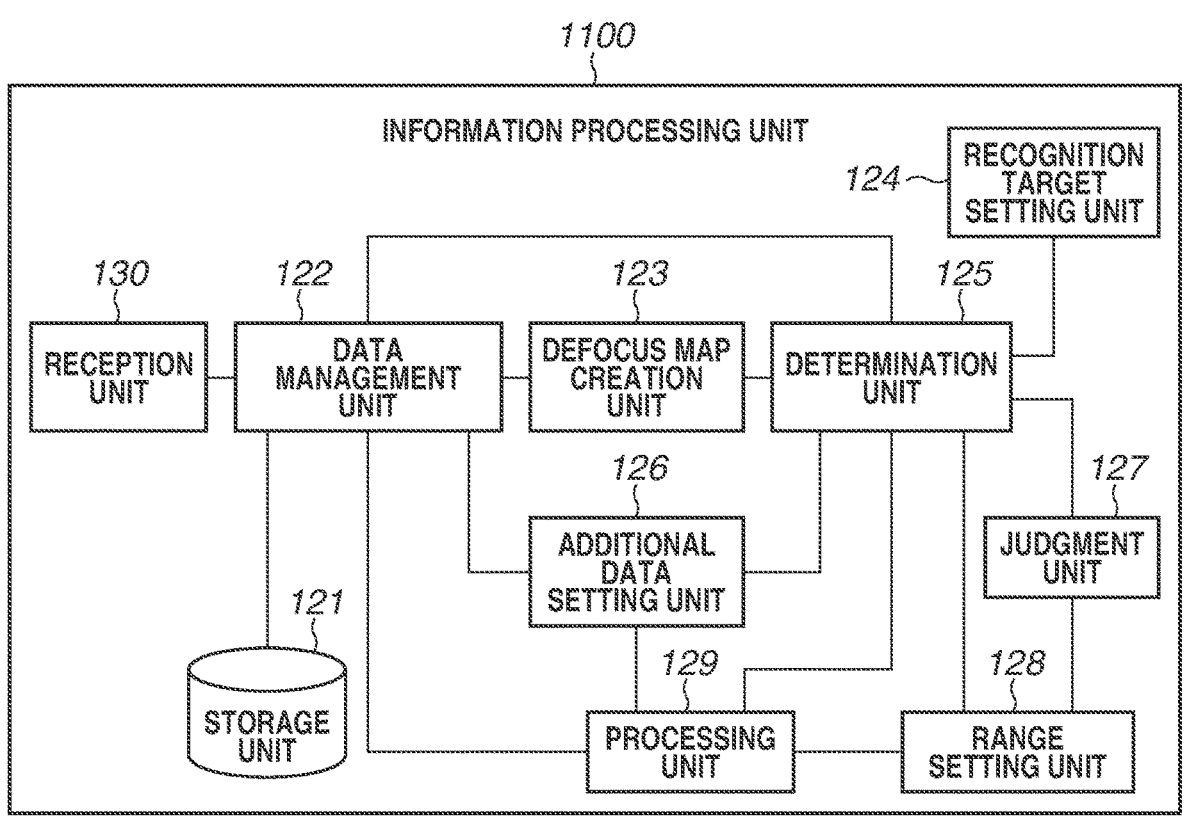
FIGS. 11A and 11B are block diagrams each illustrating an information processing apparatus according to a third exemplary embodiment.
Figure 11B:
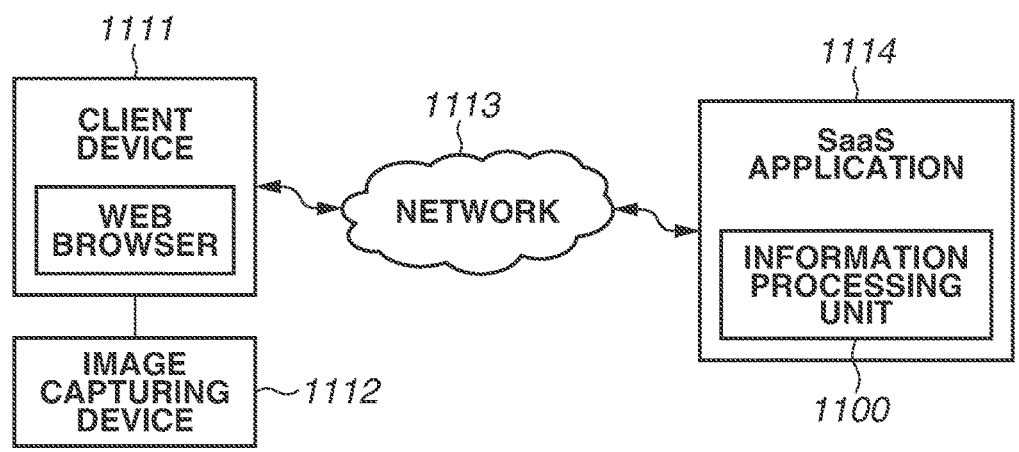

Like the second exemplary embodiment, the hardware configuration of the information processing apparatus according to the third exemplary embodiment is similar to the hardware configuration illustrated in FIG. 2A according to the first exemplary embodiment, and thus the description thereof is omitted. FIG. 11A is an example of a functional block diagram of an information processing apparatus 1100 according to the third exemplary embodiment. The information processing apparatus 1100 according to the third exemplary embodiment differs from the configuration illustrated in FIG. 8 according to the second exemplary embodiment in that the information processing apparatus 1100 is provided with a judgement unit 127, a range setting unit 128, a processing unit 129, and a reception unit 130. FIG. 11B will be described below.

The reception unit 130 is a functional unit of the CPU 101, and performs processing for receiving image data from the user. The reception unit 130 may be included in each of the information processing apparatus 100 according to the first exemplary embodiment illustrated in FIG. 1A and the information processing apparatus 800 according to the second exemplary embodiment illustrated in FIG. 8.

The judgement unit 127 is a functional unit of the CPU 101, and performs processing for judging whether to perform second determination processing based on the result of first determination processing executed by the determination unit 125. The judgement processing to be executed by the judgement unit 127 will be described in detail below.

The range setting unit 128 is a functional unit of the CPU 101. When the judgement unit 127 judges that the second determination processing is to be performed, the range setting unit 128 performs processing for setting an image range in the captured image on which the second determination processing is performed. The range setting processing to be executed by the range setting unit 128 will be described in detail below.

The processing unit 129 is a functional unit of the CPU 101. When the judgement unit 127 judges that the second determination processing is to be performed, the processing unit 129 performs predetermined image processing on image data in the image range set by the range setting unit 128. The image processing to be executed by the processing unit 129 will be described in detail below.

Figure 12:
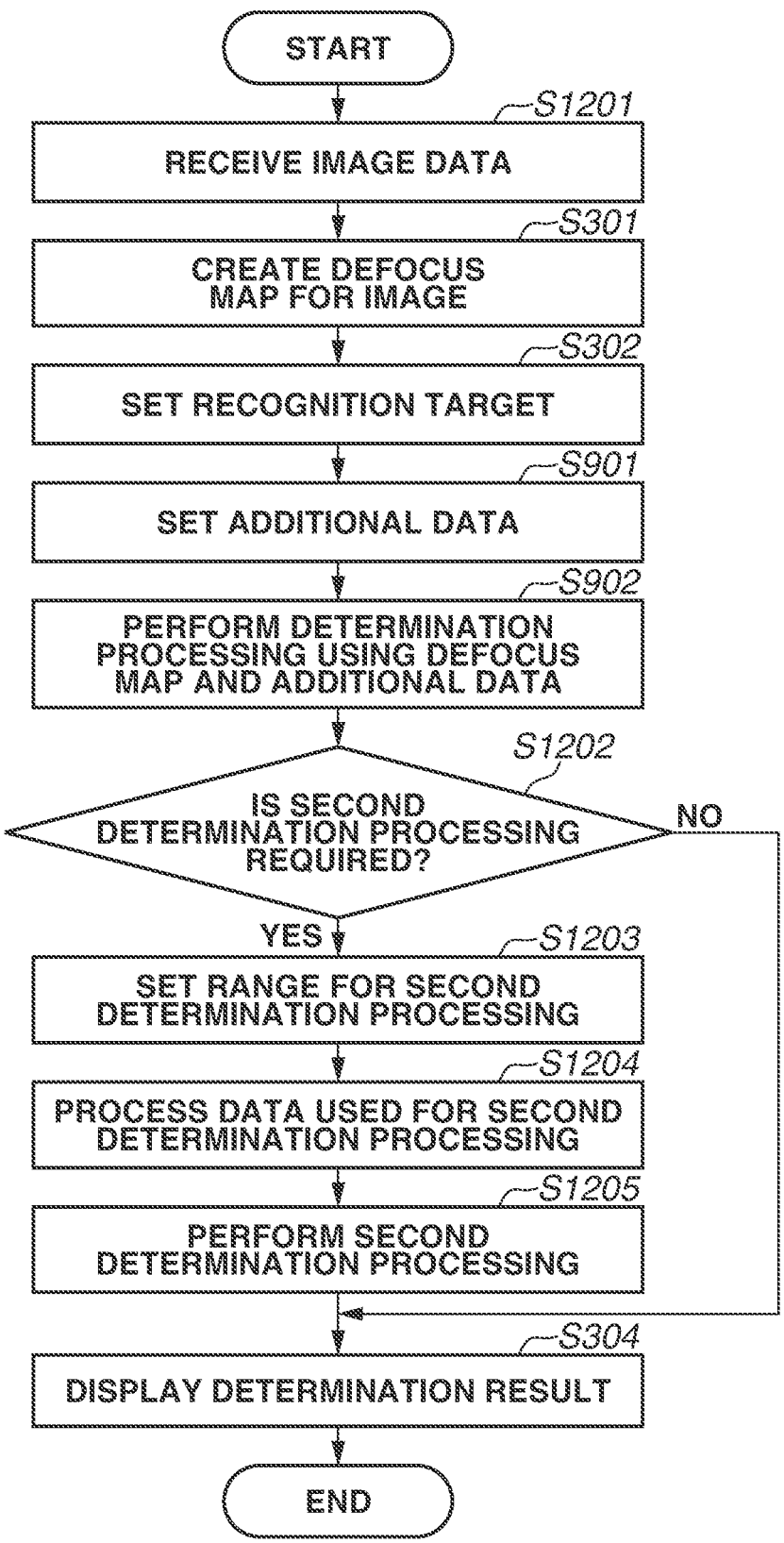
FIG. 12 is a flowchart illustrating information processing according to the third exemplary embodiment.

FIG. 12 is a flowchart illustrating a procedure of information processing to be executed by the information processing apparatus 1100 according to the third exemplary embodiment. In the flowchart of FIG. 12, the same processing operations as those in the flowchart illustrated in FIG. 3 according to the first exemplary embodiment and the flowchart illustrated in FIG. 9 according to the second exemplary embodiment are denoted by the same numbers, and the descriptions thereof are omitted.

In S1201, the reception unit 130 receives data (RGB data) on an image of an inspection target, such as a structure wall surface, which is captured by the user using, for example, a general-purpose image capturing device as typified by a digital still camera or the like. The image data acquired by the reception unit 130 is stored in the storage unit 121 through the data management unit 122. When the first determination processing is performed in the information processing apparatus 1100 according to the third exemplary embodiment, the data management unit 122 reads out the image data from the storage unit 121, and transfers the image data to the defocus map creation unit 123 and the determination unit 125.

Next, in S301, the defocus map creation unit 123 creates the defocus map in the same manner as in the above-described exemplary embodiments.

Then, in S302, the recognition target setting unit 124 sets the recognition target in the same manner as in the above-described exemplary embodiments.

Next, in S901, the additional data setting unit 126 performs predetermined image processing on the captured image and sets the obtained data as additional data. In the third exemplary embodiment, an RGB image of three channels of R, G, and B of image data obtained by capturing an image of a structure wall surface is set as additional data in S901.

Next, in S902, the determination unit 125 executes the processing of determining the range in which the recognition target can be recognized by using the defocus map and the additional data. The determination processing in S902 corresponds to the first determination processing in the third exemplary embodiment.

In the third exemplary embodiment, after S902, the processing proceeds to S1202. In S1202, the judgement unit 127 judges whether to perform second determination processing. In this case, for example, when the area ratio of the range determined that the recognition target therein can be recognized, in the first determination processing to the entire area of the captured image is 50% or more, the judgement unit 127 judges that the second determination processing is not required. If the judgement unit 127 judges that the second determination processing is not required (NO in S1202), the processing proceeds to S304. In S304, the processing of displaying the determination result is performed as described above. Then, the processing in the flowchart illustrated in FIG. 12 is terminated. On the other hand, when the area ratio of the range determined that the recognition target therein can be recognized, in the first determination processing to the entire area of the captured image is less than 50%, the judgement unit 127 judges that the second determination processing is required (YES in S1202), and the processing proceeds to S1203.

In S1203, the range setting unit 128 sets an image range for the second determination processing on the captured image. For example, the range setting unit 128 sets the region determined that the recognition target cannot be recognized therein, in the first determination processing as the image range in which the second determination processing is to be performed.

Next, in S1204, the processing unit 129 performs predetermined image processing on image data in the set image range in which the second determination processing is to be performed. Examples of the predetermined image processing according to the third exemplary embodiment include processing of converting pixel values of an image, such as contrast conversion processing. The image obtained after the predetermined image processing is performed in the image range is added to the above-described additional data by the additional data setting unit 126.

Next, in S1205, the determination unit 125 executes the second determination processing using the defocus map and the additional data including the image obtained after the image processing in S1204. After S1205, the processing proceeds to S304. In S304, processing of displaying the determination result of the second determination processing is performed. Then, the processing in the flowchart illustrated in FIG. 12 is terminated.

In the third exemplary embodiment described above, an example is described in which information processing is executed using only the functional units illustrated in FIG. 11A. However, the third exemplary embodiment may be implemented as an example of operating on software as a service (SaaS) application, for example, as illustrated in FIG. 11B. FIG. 11B is an example of a block diagram illustrating an example in which the third exemplary embodiment is implemented on the SaaS application.

A SaaS application 1114 is a service for implementing an operation by the information processing apparatus 1100.

An image capturing device 1112 is, for example, a digital still camera, and captures an image of a subject, such as a concrete structure, as an inspection target.

A client device 1111 is a general-purpose device as typified by a personal computer including a display unit, an operation unit, and a storage unit, and communicates with the SaaS application 1114 via a network 1113. The client device 1111 is connected to the image capturing device 1112 by a wired connection or a wireless connection, and retrieves image data captured by the image capturing device 1112. Further, the client device 1111 performs an operation for displaying display data acquired from the SaaS application 1114 by using a web browser or the like, and uploading the image data or the like to the SaaS application 1114.

The operation of the information processing apparatus 1100 according to the third exemplary embodiment that operates as the SaaS application will be described below with reference to FIGS. 13A to 13G and the flowchart illustrated in FIG. 12.

Figure 13A:
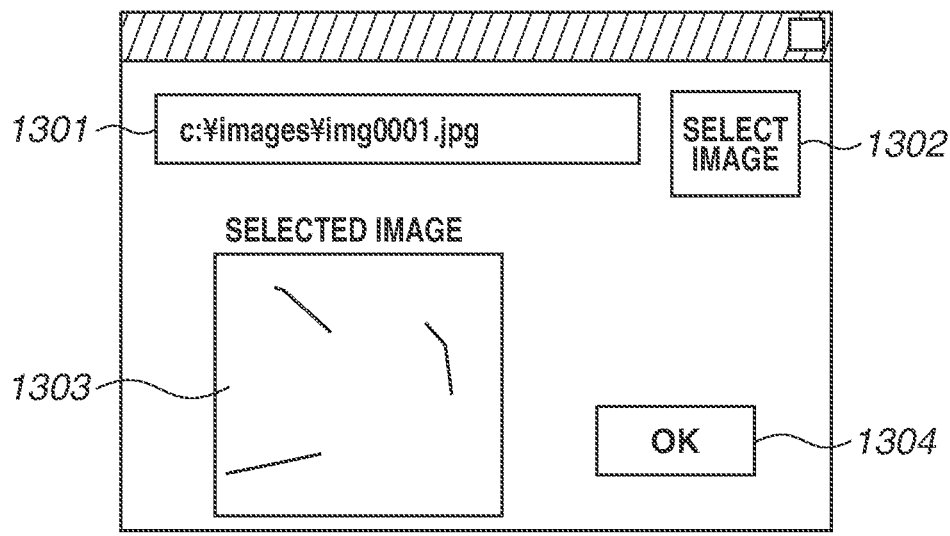
FIGS. 13A to 13G are diagrams used to describe second determination processing.

FIG. 13A illustrates an example of a UI screen to be displayed when an image captured by the user using the image capturing device is received by the reception unit 130 in S1201. The user inputs a path for an image file within the client device 1111 into a text box 1301. Alternatively, the user sends an instruction by, for example, clicking an image selection button 1302 to display an image selection dialog, and selects an image file through an operation on the image selection dialog. A region 1303 is a region in which the image of the selected image file is displayed. After the image is selected as described above, for example, the user clicks an OK button 1304. The reception unit 130 receives these input instructions from the user. Then, the reception unit 130 acquires image data from the client device 1111 via the network 1113 based on the input instruction from the user, and stores the image data in the storage unit 121 through the data management unit 122.

In the present exemplary embodiment, the image data reception processing in the reception unit 130 may be performed coordinately at a timing of the image capturing by the image capturing device 1112. In this case, when the image capturing device 1112 captures an image, the captured image data is transferred to the SaaS application 1114 through the client device 1111. Alternatively, the captured image data is directly transferred to the SaaS application 1114 from the image capturing device 1112 via a wireless network, without passing through the client device 1111. The reception unit 130 is always in a reception standby state. The reception unit 130 receives image data transmitted via the network 1113 and stores the received image data in the storage unit 121.

Figure 13B:
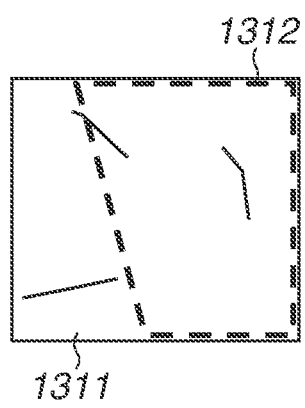
Figure 13C:
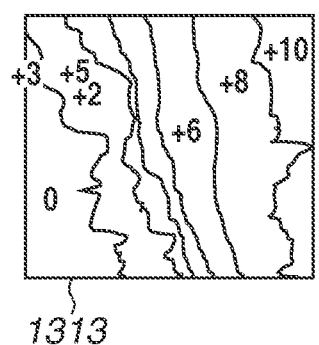

FIG. 13B illustrates an example of a captured image 1311 of the wall surface of the concrete structure as the inspection target. FIG. 13C illustrates an example of a defocus map 1313 corresponding to the image 1311. The defocus map 1313 is created by the defocus map creation unit 123 in S301. In the image 1311 of the wall surface illustrated in FIG. 13B, a range 1312 surrounded by a dashed line represents a region, such as a shade region, in which a crack cannot be visually observed easily. Each value on the defocus map 1313 illustrated in FIG. 13C is a representative value for defocus values in each region. The defocus map creation processing is similar to that of the first or second exemplary embodiment described above, and thus the description thereof is omitted.

In the third exemplary embodiment, the defocus map creation processing may be executed by an external apparatus instead of the information processing apparatus 1100. For example, a functional unit similar to the defocus map creation unit 123 may be prepared in the client device 1111. In this case, the client device 1111 creates the defocus map at a timing at which an image is retrieved from the image capturing device 1112, or at a timing at which the user sends an instruction after an image is received. Further, for example, the image capturing device 1112 may create the defocus map. In this case, the image capturing device 1112 includes a functional unit similar to the defocus map creation unit 123, and the functional unit creates the defocus map immediately after an image is captured. The image and the defocus map created by the client device 1111 or the image capturing device 1112 as described above are transferred to the SaaS application 1114 via the network 1113. When the defocus map creation processing is performed by the external apparatus of the information processing apparatus 1100, the reception unit 130 of the information processing apparatus 1100 performs processing of receiving a pair of the image and the defocus map and storing the pair of the image and the defocus map in the storage unit 121.

Figure 13D:
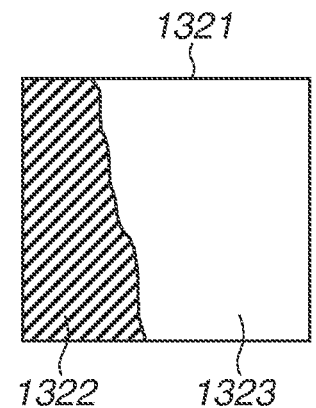

FIG. 13D illustrates an example of a determination result 1321 obtained by the determination unit 125 performing the first determination processing on the image 1311 illustrated in FIG. 13B in S902. The determination result 1321 illustrated in FIG. 13D is obtained by visualizing the result of determination processing on, for example, a crack, by using the defocus map 1313 illustrated in FIG. 13C and the above-described additional data. In the third exemplary embodiment, since RGB image data is used as additional data, the image 1311 illustrated in FIG. 13B is used as the additional data.

The judgement unit 127 judges whether the second determination processing to be executed by the determination unit 125 is required by using the determination result 1321 of the first determination processing. In the determination result 1321 of the first determination processing illustrated in FIG. 13D, a shaded region 1322 represents a region determined that a crack therein can be recognized. Accordingly, the judgement unit 127 judges whether the second determination processing is required based on the determination result 1321. Specifically, the judgement unit 127 judges whether the second determination processing is required based on the area ratio of the region determined that the recognition target therein can be recognized, to the entire area of the captured image. A determination formula based on the area ratio is represented by statement (2).

$$Ad > A \quad (2)$$

The parameter A in statement (2) represents the area ratio of the region determined that the recognition target therein can be recognized, in the determination result of the first determination processing. In the present exemplary embodiment, the parameter A is used as the ratio based on which the determination is made. The parameter Ad is a comparison parameter for the parameter A. The parameter Ad used in the present exemplary embodiment may be, for example, an experimentally obtained value, or a value directly designated by the user. As seen from statement (2), when the parameter A is less than the parameter Ad, the judgement unit 127 judges that the second determination processing is required (YES in S1202), and the processing proceeds to S1203. On the other hand, when the parameter A is more than or equal to the parameter Ad, the judgement unit 127 judges that the second determination processing is not required (NO in S1202), and the processing proceeds to S304. In S304, the determination result is displayed. Then, the processing in the flowchart illustrated in FIG. 12 is terminated.

Figure 13E:
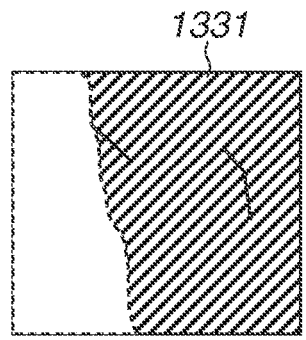

When it is determined that the second determination processing is required, the range setting unit 128 sets an image range in which the second determination processing is performed in S1203. FIG. 13E illustrates a set region 1331 on which the second determination processing is performed in the image 1311 illustrated in FIG. 13B, i.e., the image range set by the range setting unit 128. For example, the range setting unit 128 sets the region determined that the recognition target cannot be recognized therein, in the first determination processing as the image range in which the second determination processing is performed. The range setting unit 128 may obtain a rectangular region including the region determined that the recognition target cannot be recognized therein, in the first determination processing, and may set the rectangular region as the image range in which the second determination processing is performed.

After that, the processing unit 129 performs image processing on image data in the image range used for the second determination processing in S1204. In the present exemplary embodiment, image contrast conversion processing is performed as the image processing. The visibility of the recognition target, such as a crack, is changed by changing the contrast of the image. Accordingly, in the second determination processing, the determination result that is different from the determination result of the first determination processing can be obtained.

Figure 13F:
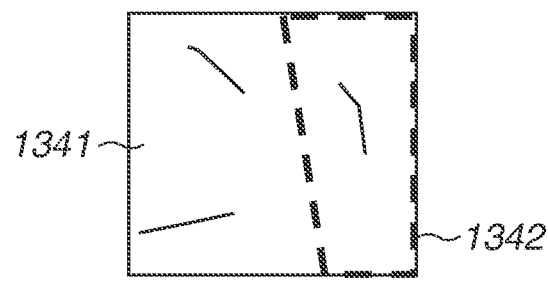

FIG. 13F illustrates an example of a converted image 1341 obtained after pixel values are changed by contrast conversion processing on the image 1311 illustrated in FIG. 13B. A range 1342 surrounded by a dashed line represents a region in which a crack cannot be visually observed easily due to the effect of shade even after the contrast conversion processing is performed. Comparing the range 1342 of the converted image 1341 illustrated in FIG. 13F with the range 1312 illustrated in FIG. 13B, it is obvious that the area of the region in which a crack cannot be visually observed easily is decreased in the image 1341 obtained after the contrast conversion processing. As describe above, the texture of the image used for determination processing can be changed by performing the contrast conversion processing on the image.

The image processing according to the present exemplary embodiment is not limited to the contrast conversion processing, but instead may be other image processing. For example, super-resolution processing on the image (captured image in the present exemplary embodiment) to be subjected to determination processing may be performed. As the super-resolution processing, for example, processing using bilinear interpolation, bicubic interpolation, or the like can be used. The super-resolution processing makes it possible to acquire local information in the image. As another example of the image processing, resolution reduction processing on the image may be performed. When the resolution reduction processing is performed, local information in the image decreases, and thus the determination processing that is insusceptible to a subtle change in texture can be performed.

Figure 13G:
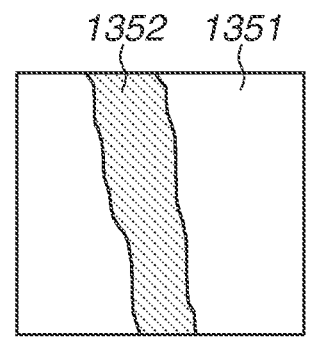

FIG. 13G illustrates an example of a determination result 1351 when the determination unit 125 performs the second determination processing in S1205. In the determination result 1351 illustrated in FIG. 13G, a shaded region 1352 is a region determined that the recognition target therein can be recognized, in the second determination processing.

After that, the display unit 105 of the information processing apparatus 1100 creates an image by superimposing the determination result on the captured image and displays the created image in S304. For example, when the second determination processing is performed, the display unit 105 superimposes the determination result of the first determination processing and the determination result of the second determination processing on the captured image and displays the image thus obtained.

Figure 14:
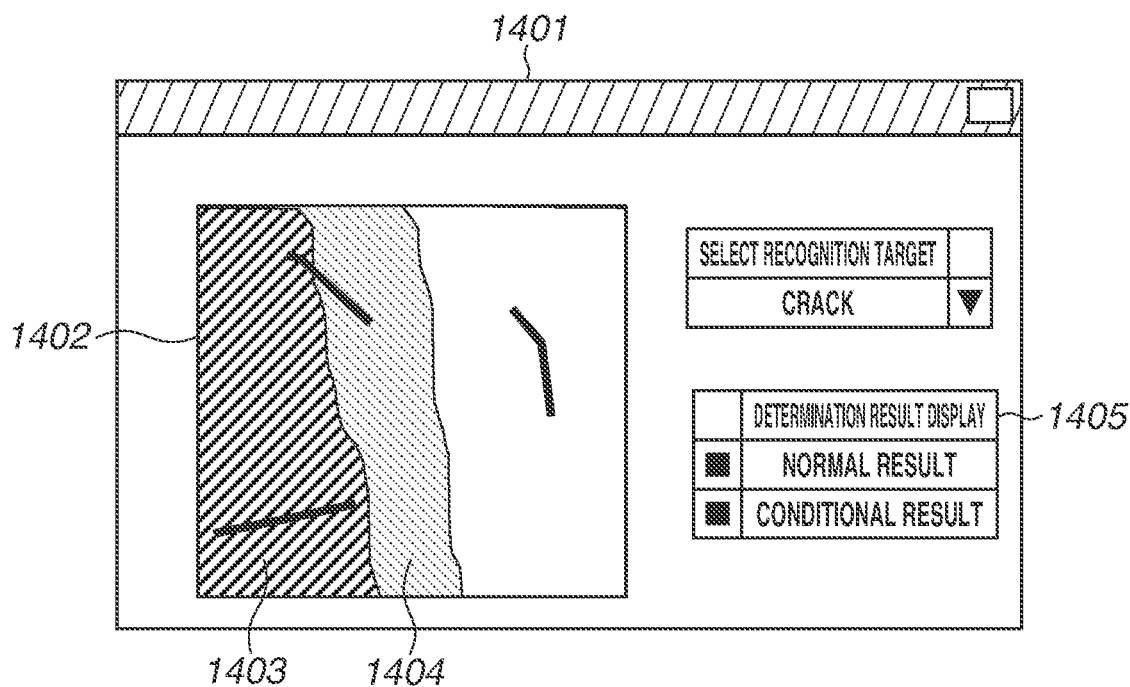
FIG. 14 is a diagram illustrating an example of displaying a plurality of determination results.

FIG. 14 illustrates an example in which an image 1402 obtained by superimposing two determination results obtained by the first determination processing and the second determination processing is displayed on a screen 1401. In the image 1402, a region 1403 is a region determined that a crack therein can be recognized, in the first determination processing, and a region 1404 is a region determined that a crack therein can be recognized, in the second determination processing. The display of this screen enables the user to collectively check a plurality of determination results. The region 1404 representing the result of the second determination processing is a conditional determination result indicating that image processing has been performed. Accordingly, it can also be determined that the reliability of the determination result indicated by the region 1404 is relatively lower than the reliability of the determination result indicated by the region 1403 that indicates the result of the first determination processing. Thus, it may be desirable to configure the screen 1401 in such a manner that the display and the non-display of the conditional determination result can be switched depending on whether to put a check in a checkbox for a determination result display setting 1405.

In a case where the user checks whether an erroneous determination is made on the determination result of the determination processing according to the first to third exemplary embodiments described above, for example, if the image to be used is large, it may take a lot of time and labor for performing the operation to check the determination result at each position in the image.

Accordingly, an information processing apparatus according to a fourth exemplary embodiment obtains a determination reason based on the determination result of determination processing, and displays the determination reason together with the determination result. This facilitates the user to determine whether the determination result is appropriate based on the determination reason. In the fourth exemplary embodiment, the information processing apparatus calculates, for example, an image feature amount for each of regions with different determination results, executes reason determination processing for determining the determination reason based on the image feature amount for each region, and further executes reason display processing for displaying the determination reason together with the determination result. Differences between the information processing according to the fourth exemplary embodiment and the information processing according to the second exemplary embodiment are mainly described.

Figure 15:
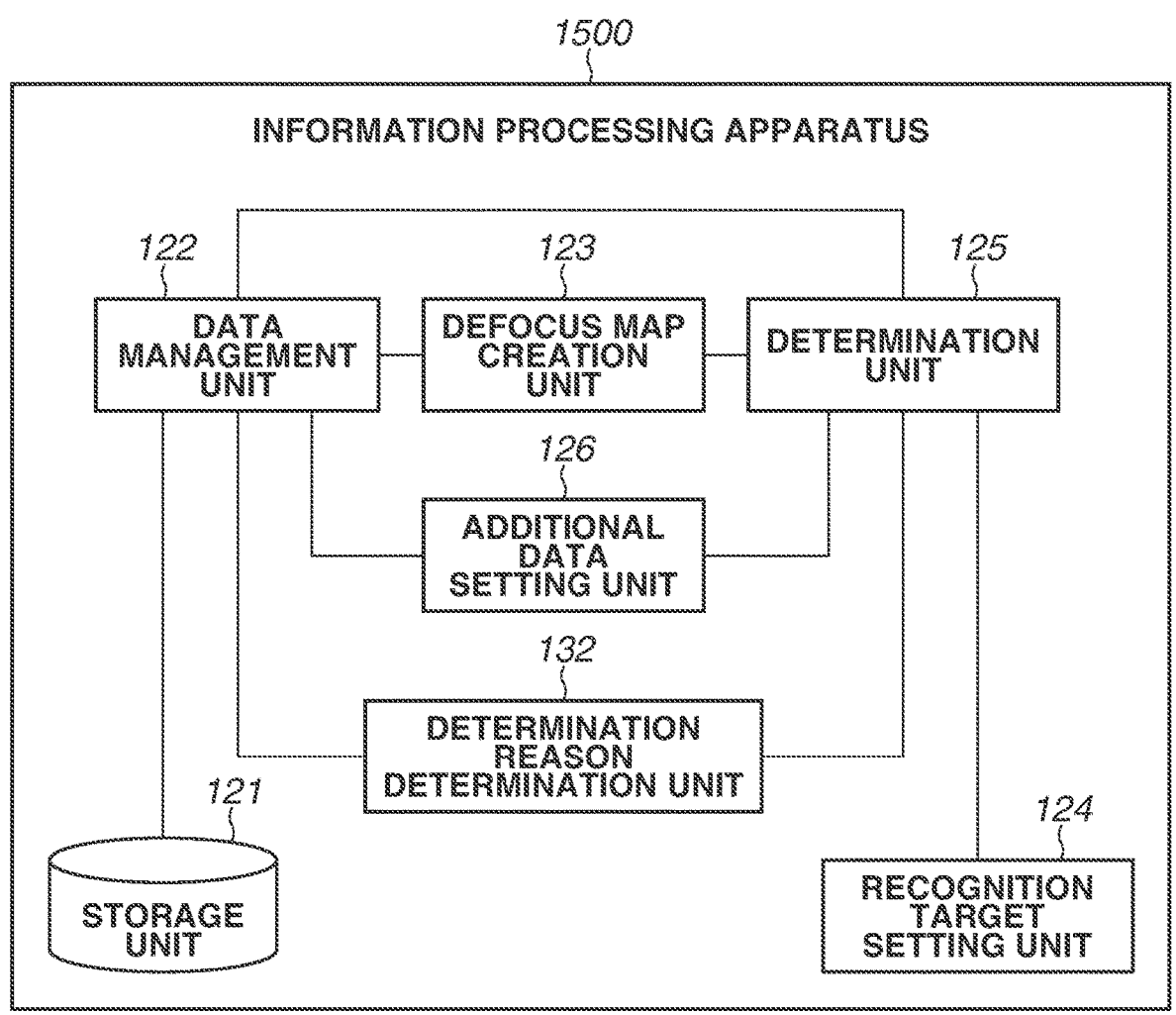
FIG. 15 is a block diagram illustrating an information processing apparatus according to a fourth exemplary embodiment.

The hardware configuration of the information processing apparatus according to the fourth exemplary embodiment is similar to the configuration illustrated in FIG. 2A, and thus the description thereof is omitted. FIG. 15 is an example of a functional block diagram of an information processing apparatus 1500 according to the fourth exemplary embodiment. The information processing apparatus 1500 according to the fourth exemplary embodiment differs from the configuration illustrated in FIG. 8 in that the information processing apparatus 1500 is provided with a determination reason determination unit 132. The determination reason determination unit 132 is a functional unit of the CPU 101, and performs reason determination processing for obtaining the determination reason based on the determination result.

Figure 16:
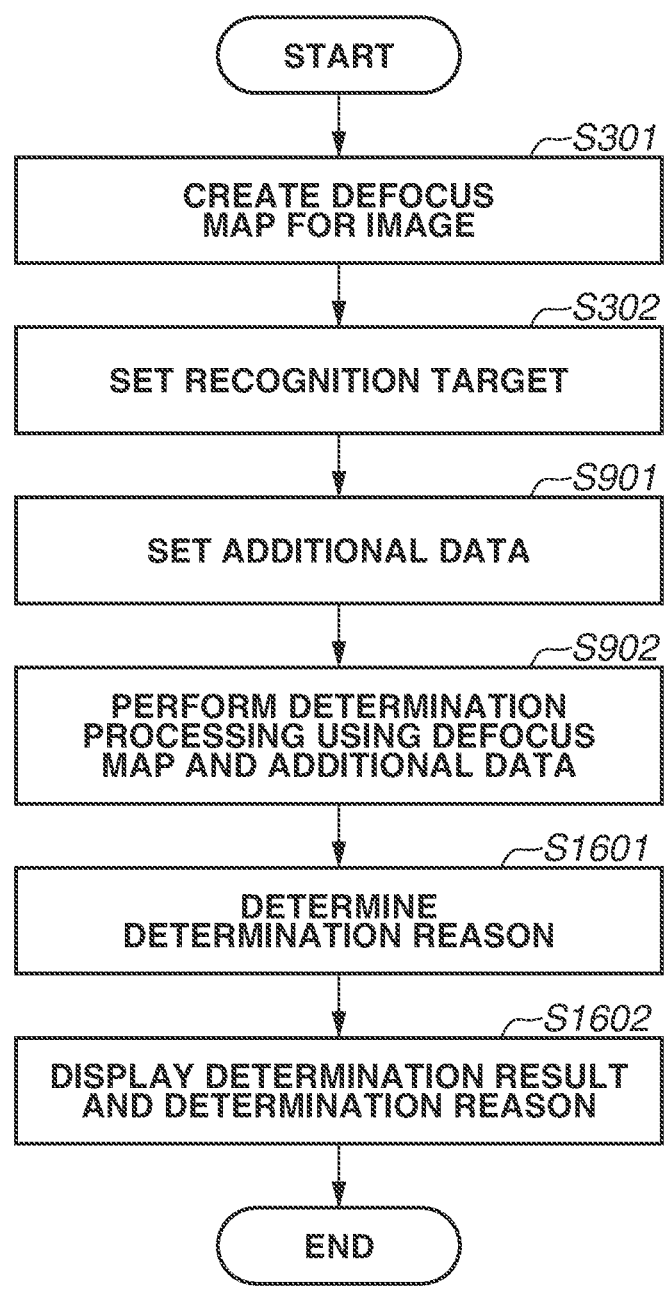
FIG. 16 is a flowchart illustrating information processing according to the fourth exemplary embodiment.

FIG. 16 is a flowchart illustrating a procedure of information processing to be executed by the information processing apparatus 1500 according to the fourth exemplary embodiment. In the flowchart illustrated in FIG. 16, the same processing operations as those in the flowchart illustrated in FIG. 9 according to the second exemplary embodiment are denoted by the same numbers, and the descriptions thereof are omitted. In the present exemplary embodiment, as the additional data set in S901, image data (RGB image) obtained by capturing an image of a structure wall surface is used. In the fourth exemplary embodiment, the determination processing using the defocus map and the additional data (RGB image) is executed in S902. Then, the processing proceeds to S1601. In S1601, the determination reason determination unit 132 performs determination reason determination processing. After that, in S1602, the display unit 105 performs processing of displaying the determination result and the determination reason. Then, the processing in the flowchart illustrated in FIG. 16 is terminated. Next, the processing of S1601 and S1602 will be described.

In S1601, the determination reason determination unit 132 performs reason determination processing for determining the determination reason based on the determination result. In S1601, the determination reason determination unit 132 first divides a captured image of an inspection target, such as a wall surface, into image regions with different determination results. Further, the determination reason determination unit 132 calculates one or more image feature amounts for each of the divided image regions. For example, the determination reason determination unit 132 calculates an average luminance value representing the brightness of the image as the image feature amount. Further, the determination reason determination unit 132 determines whether the image feature amount is determined to be the determination reason by using the determination formula in the following statement (3) based on the image feature amount calculated for the image region and a predetermined reference value. More specifically, the determination reason determination unit 132 determines whether the luminance average value (brightness difference) is determined to be the determination reason by using the determination formula in statement (3) based on the calculated luminance average value and the reference value.

$$|V1-V2| \geq V \qquad (3)$$

In statement (3), the parameters V1 and V2 are image feature amounts (luminance average values) calculated from image regions with different determination results, and the parameter V is the predetermined reference value. As the parameter V used in the present exemplary embodiment, for example, an experimentally obtained value, or a value directly designated by the user may be used. When statement (3) is satisfied, the determination reason determination unit 132 determines the calculated image feature amount to be the determination reason.

Next, the determination reason determination unit 132 calculates an image feature amount that is different from the image feature amount previously calculated from the image region. In this case, the determination reason determination unit 132 calculates a feature amount (an average value of R-values, an average values of G-values, and an average values of B-values) representing the color of the image, a feature amount (luminance value dispersion) representing the texture of the image, and the like as the image feature amount different from the image feature amount previously calculated. The determination reason determination unit 132 obtains all the image feature amounts, and determines whether each of the image feature amounts satisfies statement (3), thereby determining all the image feature amounts to be the determination reason.

Processing for determining the determination reason for the crack determination result will now be described by way of example.

FIG. 17A illustrates an example of a captured image 1701 of the wall surface on which a crack has occurred. FIG. 17B illustrates an example of a crack determination result 1702 on the captured image 1701 illustrated in FIG. 17A. In the determination result 1702, a shaded region 1703 represents a region determined that a crack therein can be recognized, and a region 1704 represents a region determined that a crack cannot be recognized therein.

The determination reason determination unit 132 divides the captured image 1701 illustrated in FIG. 17A based on the determination result 1702 illustrated in FIG. 17B. FIG. 17C illustrates a divided image 1711 obtained by dividing the captured image 1701. In the divided image 1711 illustrated in FIG. 17C, a region 1712 is a divided region determined that a crack therein can be recognized, and a region 1713 is a divided region determined that a crack cannot be recognized therein.

Further, the determination reason determination unit 132 calculates an image feature amount for each of the regions 1712 and 1713 of the divided image 1711. FIG. 17D is a table illustrating an example of the image feature amount calculated for each region. The determination reason determination unit 132 calculates an image feature amount 1721 for each of the regions 1712 and 1713 as illustrated in FIG. 17D, and determines whether each of the calculated image feature amounts satisfies statement (3). For example, when it is determined whether the average luminance value representing the brightness of the image as the image feature amount is determined to be the determination reason, the determination reason determination unit 132 first obtains the average luminance value for the region 1712 as the parameter V1 and obtains the average luminance value for the region 1713 as the parameter V2. Next, the determination reason determination unit 132 acquires the reference value "50" corresponding to the brightness of the image as the parameter V from among the reference values in the image feature amount 1721. Further, the determination reason determination unit 132 substitutes the three values, i.e., the parameters V, V1, and V2, in statement (3), and when statement (3) is satisfied, the determination reason determination unit 132 determines the average luminance value (image brightness difference) to be determination reason. The determination reason for the other image feature amounts can also be obtained in the same manner as described above.

The determination reason determination unit 132 may use a value other than the image feature amount to determine the determination reason. For example, the determination reason may be determined using a defocus value representing a degree of blur in the image. In this case, the determination reason determination unit 132 divides the defocus map into regions with different determination results, and obtains an average defocus value for each of the divided regions. Further, the determination reason determination unit 132 sets average defocus values for different regions as the parameters V1 and V2, respectively, and sets a predetermined defocus reference value as the parameter V, thereby determining whether the defocus state (degree of focus) is determined to be the determination reason by using statement (3).

Next, in S1602, the information processing apparatus 1500 performs reason display processing of displaying the determination reason on the display unit 105 to display in addition to the image obtained by superimposing the determination result on the captured image FIG. 18A illustrates an example of a screen 1801 on which a determination result 1802 created by superimposing the result obtained by visualizing the determination result on the captured image and a determination reason list 1806 are displayed. The determination result 1802 is an image obtained by superimposing the captured image of the wall surface and the determination result. FIG. 18A illustrates an example in which the crack determination result selected by the user through an operation on a recognition target selection pull-down 1805 is displayed.

In the determination result 1802, a shaded region 1803 represents a region determined that each crack therein can be recognized, and a region 1804 is a region determined that a crack cannot be recognized therein. The determination reason list 1806 indicates the determination reason for the crack determination result selected in the recognition target selection pull-down 1805.

In the determination reason list 1806, each of the checked items indicates a reason for the crack determination result. More specifically, the example of the determination reason list 1806 indicates that the brightness, texture, and defocus of the image in the region 1803 determined that each crack therein can be recognized are different from those in the region 1804 determined that a crack cannot be recognized therein.

On the other hand, in the determination reason list 1806, there is no great difference between unchecked items (e.g., image color items) of the region 1803 and unchecked items of the region 1804. In other words, these are not factors for causing a difference in determination reason. This display enables the user to check the determination result together with the determination reason, so that the user can easily determine whether the determination result is appropriate. The contents displayed in the determination reason list 1806 are updated depending on the selected recognition target. More specifically, when the user operates the recognition target selection pull-down 1805 to input an instruction to change the recognition target, the information processing apparatus 1500 updates the display of the determination reason list 1806 in conjunction with the operation.

The determination reason may be displayed, for example, in a graph format as illustrated in FIG. 18B. In the example of FIG. 18B, calculated values, including the corresponding image feature amounts, for respective determination reason items, are displayed together with a determination criterion in a graph format. This facilitates the user to check a degree of influence of each determination reason. For example, in a determination reason list 1811, a graph 1812 representing the calculated value of an image brightness difference (average luminance value) goes significantly beyond a determination criterion 1813. Thus, it is obvious that the image brightness difference is one of the determination reasons and has a significant influence. A graph 1814 representing the calculated value of a color difference (blue) (i.e., average value of B-values) falls significantly below a determination criterion 1815. Thus, it is obvious that the blue color of the image has a less influence on the recognition determination. The visualization processing as described above enables the user to easily recognize the degree of influence of each determination reason.

According to the exemplary embodiments described above, it is possible to reduce the work load on the user when it is determined whether a captured image of a subject is suitable for recognition processing on each recognition target, and thus it is possible to enhance the operating efficiency.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-063890, which was filed on Mar. 31, 2020 and which is hereby incorporated by reference herein in its entirety.

What is claimed is:

1. An information processing apparatus, comprising:
   one or more processors,
   wherein the one or more processors execute:
   acquiring a defocus map corresponding to a captured image;
   setting a first recognition target from among a plurality of recognition targets, wherein each recognition target of the plurality of recognition targets has at least one respective defocus criterion, and wherein the at least one respective defocus criterion of the first recognition target is different from the at least one respective defocus criterion of other recognition targets of the plurality of recognition targets;
   determining, based on the defocus map and on the at least one respective defocus criterion of the first recognition target, whether the first recognition target is recognizable in the captured image; and
   displaying a result of determining whether the first recognition target is recognizable at a position in the captured image displayed on a display device.

2. The information processing apparatus according to claim 1, wherein the defocus map represents a distribution of defocus values each indicating a degree of focus when the captured image is captured at each position in the captured image.

3. The information processing apparatus according to claim 2, wherein the one or more processors perform the determination at each position in the captured image based on the defocus value at each position on the defocus map.

4. The information processing apparatus according to claim 1,
   wherein the one or more processors set additional data related to a texture of the captured image, and
   wherein the one or more processors perform the determination using the defocus map and the additional data, in the determination.

5. The information processing apparatus according to claim 4, wherein the one or more processors generate the additional data by performing predetermined image processing on the captured image, in the setting of the additional data.

6. The information processing apparatus according to claim 5, wherein the one or more processors generate, as the additional data, data obtained by changing a value of each pixel of the captured image by the predetermined image processing.

7. The information processing apparatus according to claim 5, wherein the predetermined image processing is fast Fourier transform processing and the additional data is data on any frequency component obtained by the fast Fourier transform processing.

8. The information processing apparatus according to claim 5, wherein the predetermined image processing is processing of extracting an edge contour component and the additional data is data including the edge contour component.

9. The information processing apparatus according to claim 4, wherein the additional data is an image of three channels of red (R), green (G), and blue (B) obtained by the image capturing.

10. The information processing apparatus according to claim 4, wherein the one or more processors divide the captured image into image regions based on a result of the determination, acquire an image feature for each of the divided image regions, and determine a determination reason for the result of the determination based on the image feature for each of the divided image regions.

11. The information processing apparatus according to claim 10, wherein the one or more processors cause a display device to display the determination reason for the result of the determination.

12. The information processing apparatus according to claim 4, wherein the one or more processors divide the captured image into image regions based on a result of the determination, acquire a defocus value for each of the divided image regions, and determine a determination reason for the result of the determination based on the defocus value for each of the divided image regions.

13. The information processing apparatus according to claim 1, wherein the first recognition target includes a crack on a surface of a structure.

14. The information processing apparatus according to claim 1,
   wherein the one or more processors determine whether the first recognition target in the captured image is recognizable based on a feature obtained from the captured image and determine whether to perform a second determination based on a result of a first determination,
   wherein the one or more processors set, in a case where it is determined that the second determination is to be performed, an image range based on the result of the first determination,
   wherein the one or more processors perform predetermined image processing on an image in the set image range, and
   wherein the one or more processors perform, in a case where it is determined that the second determination is to be performed, the second determination to determine whether the first recognition target is recognizable based on data generated by the image processing.

15. The information processing apparatus according to claim 14, wherein the predetermined image processing is processing for changing a value of each pixel of an image in the image range, contrast conversion processing on the image, super-resolution processing on the image, or resolution reduction processing on the image.

16. The information processing apparatus according to claim 4, wherein the one or more processors cause a display device to display the captured image, a result of the first determination, and a result of the second determination in association with each other in positional relationship.

17. The information processing apparatus according to claim 1, wherein the one or more processors recognize the recognition target.

18. The information processing apparatus according to claim 1, wherein the one or more processors obtain a selection of a selected type of recognition target, and set the first recognition target according to the selected type.

19. The information processing apparatus according to claim 1, wherein the one or more processors further execute:
   setting a second recognition target from among the plurality of recognition targets, wherein the at least one respective defocus criterion of the second recognition target is different from the at least one respective defocus criterion of the first recognition target;

determining, based on the defocus map and on the at least one respective defocus criterion of the second recognition target, whether the second recognition target is recognizable in the captured image; and displaying a result of determining whether the second recognition target is recognizable at a second position in the captured image displayed on the display device.

20. The information processing apparatus according to claim 19, wherein the at least one respective defocus criterion of the first recognition target indicates a first focus range, and wherein the at least one respective defocus criterion of the second recognition target indicates a second focus range that is different from the first focus range.

21. The information processing apparatus according to claim 19, wherein the one or more processors further execute:

obtaining a selection of the at least one respective defocus criterion of the first recognition target; and obtaining a selection of the at least one respective defocus criterion of the second recognition target.

22. The information processing apparatus according to claim 21, wherein the one or more processors further execute:

displaying, on the display device, a user interface that is configured to receive selections of defocus criteria, wherein the selection of the at least one respective defocus criterion of the first recognition target and the selection of the at least one respective defocus criterion of the second recognition target are obtained via the user interface.

23. The information processing apparatus according to claim 1, wherein displaying the result of determining whether the first recognition target is recognizable at the position in the captured image displayed on the display device includes displaying a first indicator that indicates a region in the captured image in which the first recognition target is recognizable and displaying a second indicator that indicates a region in the captured image in which the first recognition target is not recognizable.

24. An information processing method executed by an information processing apparatus, the method comprising:

creating a defocus map corresponding to a captured image;

setting a recognition target from among a plurality of recognition targets wherein each recognition target of the plurality of recognition targets has at least one respective defocus criterion, and wherein the at least one respective defocus criterion of the first recognition target is different from the at least one respective defocus criterion of other recognition targets of the plurality of recognition targets;

determining, based on the defocus map and on the at least one respective defocus criterion of the recognition target, whether the recognition target is recognizable in the captured image; and displaying a result of determining whether the recognition target is recognizable at a position in the captured image displayed on a display device.

25. A non-transitory computer-readable storage medium storing a program for causing a computer to execute an information processing method, the method comprising:

creating a defocus map corresponding to a captured image;

setting a recognition target from among a plurality of recognition targets, wherein each recognition target of the plurality of recognition targets has at least one respective defocus criterion, and wherein the at least one respective defocus criterion of the first recognition target is different from the at least one respective defocus criterion of other recognition targets of the plurality of recognition targets;

determining, based on the defocus map and on the at least one respective defocus criterion of the recognition target, whether the recognition target is recognizable in the captured image; and displaying a result of determining whether the recognition target is recognizable at a position in the captured image displayed on a display device.

* * * * *